(12) United States Patent
Miyashita et al.

(10) Patent No.: US 7,483,821 B2
(45) Date of Patent: Jan. 27, 2009

(54) TIRE PARAMETER DERIVING METHOD, TIRE CORNERING CHARACTERISTIC CALCULATING METHOD, TIRE DESIGNING METHOD, VEHICLE DYNAMICS ANALYZING METHOD, AND PROGRAM

(75) Inventors: Naoshi Miyashita, Kanagawa (JP); Kazuyuki Kabe, Kanagawa (JP)

(73) Assignee: Yokohama Rubber Co., Ltd, Tokyo (JP)

( * ) Notice: Subject to any disclaimer, the term of this patent is extended or adjusted under 35 U.S.C. 154(b) by 361 days.

(21) Appl. No.: 10/942,830

(22) Filed: Sep. 17, 2004

(65) Prior Publication Data

US 2005/0065666 A1   Mar. 24, 2005

(30) Foreign Application Priority Data

Sep. 19, 2003   (JP)   ............................. 2003-327750

(51) Int. Cl.
*G06F 9/455*   (2006.01)

(52) U.S. Cl. .......................................................... 703/8

(58) Field of Classification Search ...................... 703/3, 703/8; 303/150; 701/80, 70, 69; 73/146; 150/209.11; 280/757
See application file for complete search history.

(56) References Cited

U.S. PATENT DOCUMENTS

| | | | | | |
|---|---|---|---|---|---|
| 4,715,662 | A | * | 12/1987 | van Zanten et al. | 303/150 |
| 5,742,917 | A | * | 4/1998 | Matsuno | 701/69 |
| 6,615,124 | B1 | * | 9/2003 | Adachi | 701/70 |
| 6,754,615 | B1 | * | 6/2004 | Germann et al. | 703/8 |
| 2001/0007965 | A1 | * | 7/2001 | Yokoyama et al. | 701/70 |
| 2002/0014114 | A1 | * | 2/2002 | Mancosu et al. | 73/146 |
| 2002/0087251 | A1 | * | 7/2002 | Kogure et al. | 701/80 |
| 2002/0167156 | A1 | * | 11/2002 | Akutagawa et al. | 280/757 |
| 2003/0093206 | A1 | * | 5/2003 | Pallot | 701/70 |
| 2005/0139301 | A1 | * | 6/2005 | Nakamura | 152/209.11 |

FOREIGN PATENT DOCUMENTS

JP   2003-057134 A1   2/2003

OTHER PUBLICATIONS

Kazuo Araki, Hideo Sakai and Minao Yanase, "Study of a Semi-Empirical Tire Model for Vehicle Dynamics Analysis—Part 1 Under the Condition of Constant Velocity -", Transactions of Society of Automotive Engineers of Japan, vol. 24 (2), 59, 1993.

\* cited by examiner

*Primary Examiner*—Kandasamy Thangavelu
(74) *Attorney, Agent, or Firm*—Knobbe, Martens, Olson & Bear, LLP

(57) ABSTRACT

A method for tire parameter derivation, tire cornering characteristic calculation and tire design is used with a tire dynamic model constituted by using a plurality of tire dynamic element parameters including stiffness and friction coefficient and parameter defining a distribution of contact pressure of the tire. The parameters and tire cornering characteristic are derived by using the combined sum of squared residuals being obtained by weighted addition of a first sum of squared residuals of lateral force and a second sum of squared residuals of self-aligning torque. The tire dynamic model is a model for calculating a lateral force and for calculating a self-aligning torque separately as a lateral force-based torque component generated by the lateral force applied on a contact patch of the tire and a longitudinal force-based torque component generated by a longitudinal force applied on the contact patch of the tire.

58 Claims, 16 Drawing Sheets

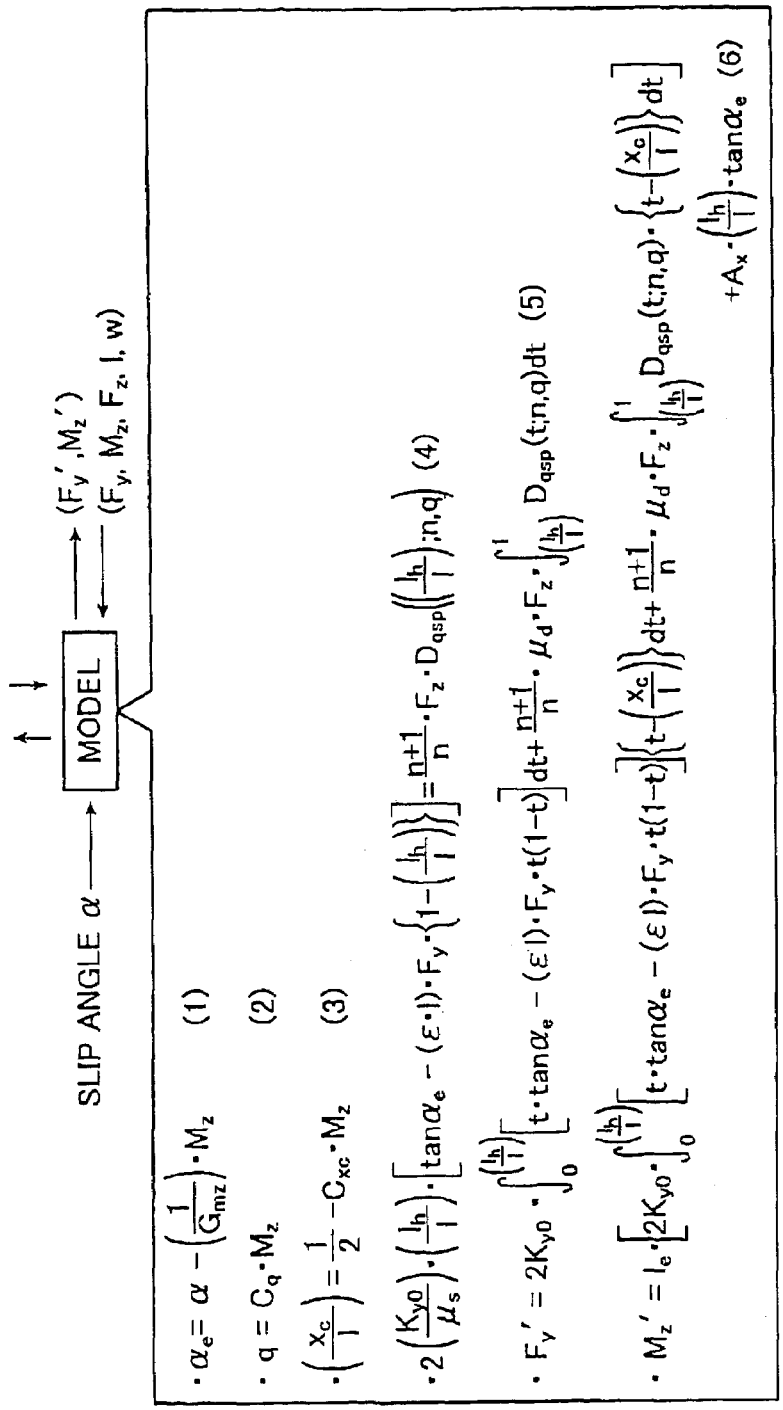

FIG. 4A   FIG. 4B
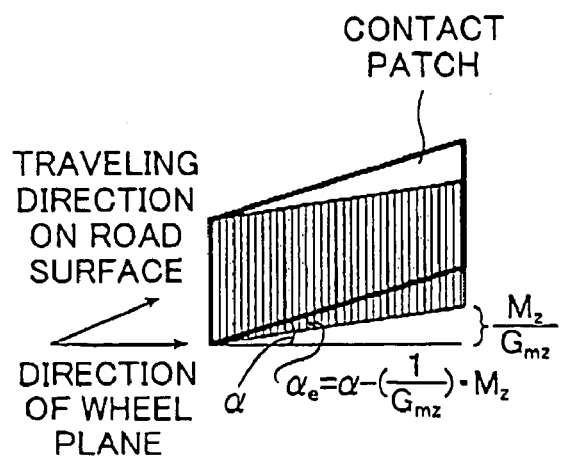
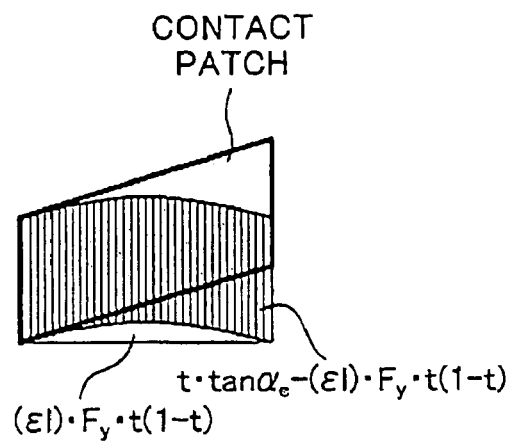
FIG. 4C
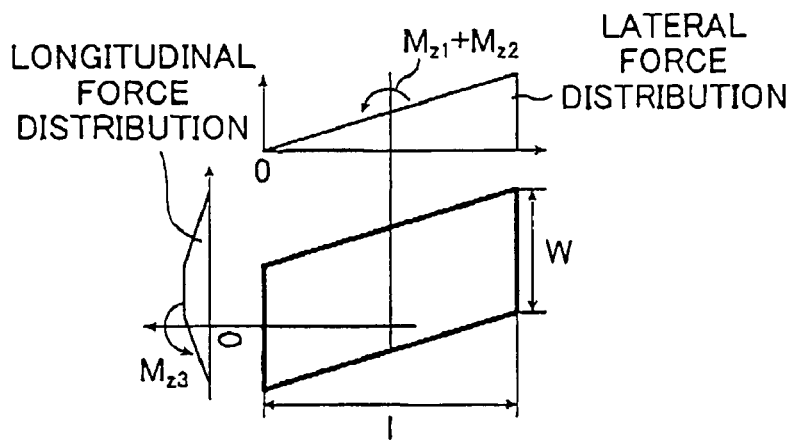

FIG. 5A
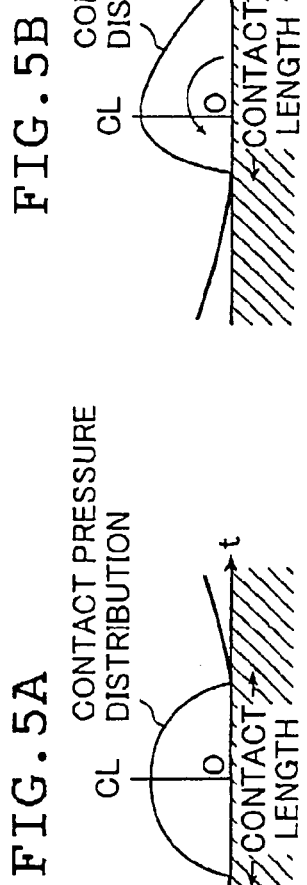
FIG. 5B
$$p(t) = \frac{n+1}{n} \cdot \frac{F_z}{wl} \cdot D_{gsp}(t;n,q) \quad (7)$$
WHERE $D_{gsp}(t;n,q) = (1-|2t-1|^n) \cdot \{1-q \cdot (2t-1)\}$
FIG. 5C
VARIATION WITH COEFFICIENT n IN $D_{gsp}(t;n,q)$
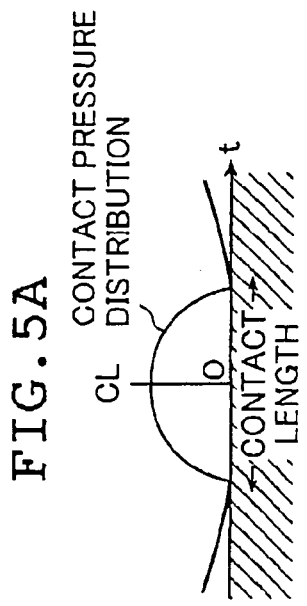
FIG. 5D
VARIATION WITH BIAS COEFFICIENT q IN $D_{gsp}(t;n,q)$
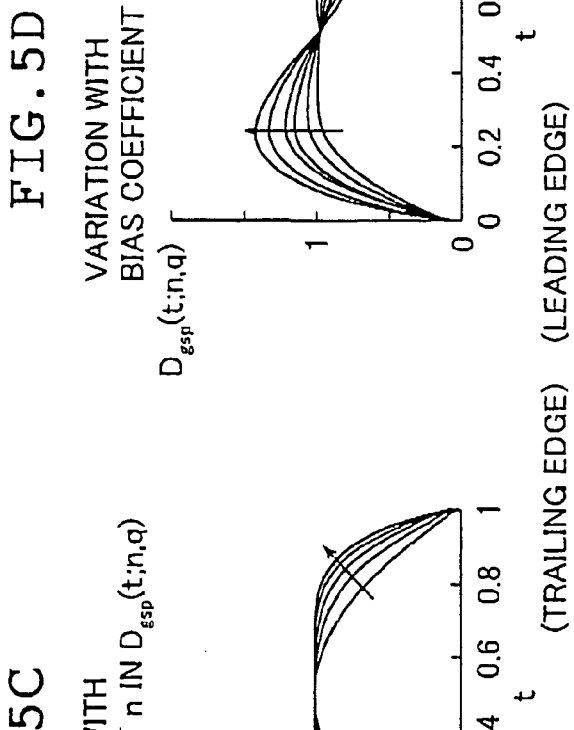

TIRE PARAMETER DERIVING METHOD, TIRE CORNERING CHARACTERISTIC CALCULATING METHOD, TIRE DESIGNING METHOD, VEHICLE DYNAMICS ANALYZING METHOD, AND PROGRAM

BACKGROUND OF THE INVENTION

The present invention relates to a tire parameter deriving method for deriving a tire dynamic element parameter indicating a cornering characteristic of the tire based on a tire dynamic model constituted by using a plurality of tire dynamic element parameters, a tire cornering characteristic calculating method for calculating the cornering characteristic of a tire based on the tire dynamic model, and a tire designing method for designing a tire and a vehicle dynamics analyzing method using the above method, and also to a program for allowing a computer to execute the tire parameter deriving method.

Various methods for evaluating and analyzing vehicle dynamic characteristics by using a computer are currently utilized. For the analysis of the dynamic characteristics, information of a cornering characteristic of a tire provided between a vehicle body and a road surface is required. The cornering characteristic of the tire is generally defined by using a tire model. As the tire model, a non-analytic model such as a "Magic Formula" has recently been proposed.

The "Magic Formula" is a non-analytic model describing tire characteristics by determining factors B to E in the following Formula (1) so that measured data of a lateral force and measured data of a self-aligning torque are approximated in an excellent manner by a function expressed by the Formula (1).

$$Y(x) = D \cdot \sin[C \cdot \tan^{-1}\{B \cdot x - E \cdot (B \cdot x - \tan^{-1}(B \cdot x))\}] \quad (1)$$

The "Magic Formula" expressed by the above Formula (1) can be effectively used as a cornering characteristic of a tire so as to evaluate and analyze dynamic characteristics of a vehicle. However, the "Magic Formula" is a model obtained by exclusively describing a cornering characteristic of a tire as a tire characteristic, neglecting an actual dynamic behavior of the tire. Therefore, the above-mentioned factors B to E do not represent any dynamic mechanism affecting the cornering characteristic of a tire. Therefore, even if the factors B to E are successfully obtained, these factors have no relation and correlation with tire dynamic element parameters such as various stiffnesses affecting the cornering characteristic of the tire. Therefore, there is conventionally a problem that a tire cannot be designed based on various stiffnesses of the tire via the above-mentioned tire model.

On the other hand, as a tire dynamic model representing the cornering characteristic of a tire using the tire dynamic element parameters such as various stiffnesses of the tire, a tire dynamic model obtained by modifying a Fiala model described in a non-patent document of "Study of a Semi-Empirical Tire Model for Vehicle Dynamics Analysis—Part 1 Under the Condition of Constant Velocity—" by Kazuo Araki, Hideo Sakai and Minao Yanase, Transactions of Society of Automotive Engineers of Japan, Vol. 24 (2), 59 (1993) is known.

However, the "tire model" described in the above document has the following problem. Even if tire dynamic element parameters can be calculated so that calculated data of a lateral force is identical with its measured data, calculated data of a self-aligning torque generated with the lateral force cannot be identical with its measured data. In particular, if a slip angle is equal to or larger than 5 degrees, the calculated data greatly differs from the measured data.

SUMMARY OF THE INVENTION

In view of the above problems, the present invention provides a tire parameter deriving method and a computer program on a computer readable storage medium which allows the computer to perform the tire parameter deriving method. In the method, tire dynamic element parameters of a tire dynamic model are numerically derived and output. The tire dynamic model is constituted by using the tire dynamic element parameters such as stiffness, coefficients and compliance of the tire and has a function of calculating lateral force data and self aligning torque data according to an input slip angle as theoretical data. The tire dynamic element parameters reproduce a cornering characteristic of a tire to be simulated based on the tire dynamic model.

In the method, measured data including data of a lateral force and a self-aligning torque of a tire under a plurality of measurement conditions is acquired. The measurement conditions, for example, include various slip angle conditions or various applied load conditions. Then, the tire dynamic element parameters are numerically derived such that a combined sum of squared residuals between the acquired measurement data and the theoretical data calculated by using the tire dynamic model in which the tire dynamic element parameters are given numerical values becomes a predetermined value or less. The combined sum of squared residuals, for example, corresponds to the $Q_c$ of the Formula (8). Finally, the numerically derived parameters are output to a display or a printer for use in analysis or tire design.

Alternatively, in the method, tire dynamic model calculates the self-aligning torque including a lateral force-based torque component generated by the lateral force applied on a contact patch of the tire and a longitudinal force-based torque component generated by a longitudinal force applied on the contact patch of the tire, both components being separately calculated according to the input slip angle. The tire dynamic element parameters including parameters for determining the lateral force-based torque component and parameters for determining the longitudinal force-based torque component such that an error, such as the combined sum of squared residuals, is reduced to a predetermined value or less. The error is obtained by combining a first sub-error between the measured data of the lateral force and corresponding theoretical data of the lateral force calculated by the tire dynamic model in which the tire dynamic element parameters are given numerical values and a second sub-error between the measured self-aligning torque and corresponding theoretical data of the self-aligning torque calculated by the tire dynamic model in which the tire dynamic element parameters are given the numerical values.

The present invention also provides a tire cornering characteristic calculating method and a computer program on a computer readable storage medium which allows the computer to perform the tire cornering characteristic calculating method. In the method, a cornering characteristic of a tire based on a tire dynamic model constituted by using a plurality of tire dynamic element parameters is calculated and output. The tire dynamic element parameters reproduce the cornering characteristic of the tire based on the tire dynamic model. The tire dynamic model has a function of calculating lateral force data and self-aligning torque data according to an input slip angle.

At first, the tire dynamic element parameters are numerically input. Then, a value of a lateral force and a value of a self-aligning torque under each of a plurality of cornering conditions are initially set. The set values are used with the set tire dynamic element parameters to calculate corresponding data of the lateral force and the self-aligning torque. Then, the set values are repeatedly corrected until a combined sum of squared residuals between the set values of the lateral force and the self-aligning torque and the calculated corresponding data, which is exemplified by $Q_c$ of the Formula (8), becomes a predetermined value or less. And, finally the lateral force and the self-aligning torque which are calculated by using the corrected set values that make the combined sum of squared residuals be equal to or less than the predetermined value to a display or printer are output for use in analysis or tire design.

The present invention also provides a method of designing a tire using the above mentioned tire cornering characteristic calculating method.

BRIEF DESCRIPTION OF THE DRAWINGS

In the accompanying drawings:

FIG. 3 is another diagram for illustrating the tire dynamic model used in the tire parameter deriving method and the tire cornering characteristic calculating method according to the present invention;

FIGS. 4A to 4C are further diagrams, each for illustrating the tire dynamic model used in the tire parameter deriving method and the tire cornering characteristic calculating method according to the present invention;

FIGS. 5A to 5D are further diagrams, each for illustrating the tire dynamic model used in the tire parameter deriving method and the tire cornering characteristic calculating method according to the present invention;

DETAILED DESCRIPTION OF THE PREFERRED EMBODIMENT

Hereinafter, a tire parameter deriving method, a tire cornering characteristic calculating method, a tire designing method, a vehicle dynamics analyzing method and a program according to the present invention will be described in detail based on an embodiment with reference to the accompanying drawings.

Figure 1:
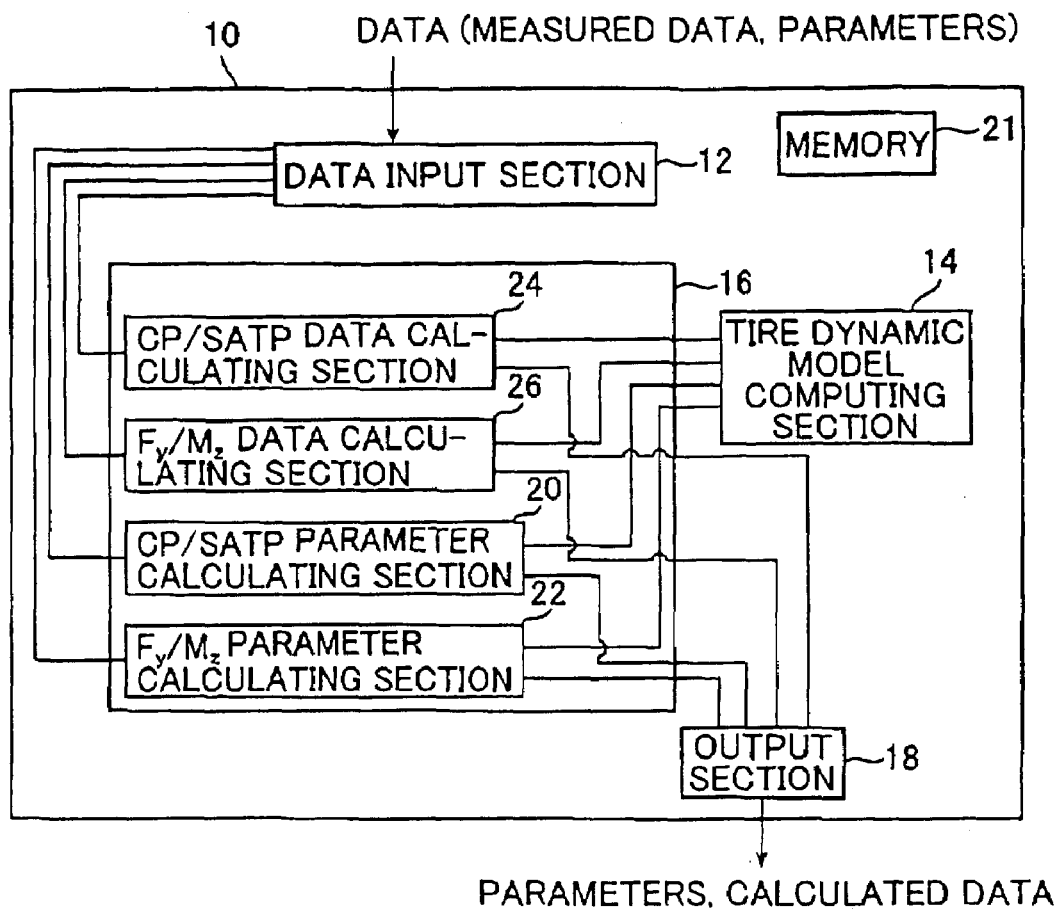
FIG. 1 is a block diagram showing a computing unit of an embodiment for executing a tire parameter deriving method and a tire cornering characteristic calculating method according to the present invention.

FIG. 1 is a block diagram showing a computing unit 10 for executing a tire parameter deriving method and a tire cornering characteristic calculating method according to the present invention.

The computing unit 10 derives a plurality of tire dynamic element parameters (hereinafter, referred to simply as parameters) based on a tire dynamic model described below in response to an input of measured data such as a lateral force $F_y$ and a self-aligning torque (hereinafter, referred to simply as a torque) $M_z$. Alternatively, the computing unit 10 calculates corresponding data of the lateral force and the torque by using the tire dynamic model in response to an input of parameters which characterizes a cornering characteristic of a tire in the tire dynamic model.

Herein, the cornering characteristic designates characteristic curves of load dependency of a CP and an SATP described below or characteristic curves of slip angle dependency of the lateral force and the torque.

The computing unit 10 includes: a data input section 12 for receiving various data such as measured data and parameters; a tire dynamic model computing section 14 for describing the tire dynamic model in an analytical formula and calculating the lateral force and the torque by using the set parameters; a processing section 16 for allowing the tire dynamic model computing section 14 to perform computation in a predetermined sequence to derive various parameters corresponding to the tire dynamic element parameters or to calculate the lateral force and the torque in a mechanically balanced state (in equilibrium) in the tire dynamic model; and an output section 18 for organizing various derived parameters or the calculated data of the lateral force and the torque so as to output the data to a monitor or a printer not shown.

As the tire dynamic element parameters calculated based on the tire dynamic model, the following parameters are given by way of example.

(a) A lateral stiffness $K_{y0}$ defined by a lateral shear stiffness of a tire;
(b) A sliding friction coefficient $\mu_d$ between a road surface and a tire;
(c) A lateral stiffness coefficient ($K_{y0}/\mu_s$) obtained by dividing the lateral stiffness $K_{y0}$ by an adhesive friction coefficient $\mu_s$ between the road surface and the tire;
(d) A lateral bending compliance $\epsilon$ of a belt part;
(e) A torsional compliance ($1/G_{mz}$) corresponding to an inverse number of a torsional stiffness about a tire center axis of the tire;
(f) A coefficient n for defining a contact pressure distribution on a contact patch when the lateral force is generated;
(g) A coefficient $C_q$ indicating the degree of a bias in the contact pressure distribution;
(h) A shift coefficient $C_{xc}$ indicating the degree of a longitudinal shift of the center position of the tire on the contact patch;
(i) An effective contact length $l_c$ when the lateral force is generated;
(j) A longitudinal stiffness $A_x$ (a parameter for defining a longitudinal torque component) in the contact patch; and the like.

Herein, the lateral stiffness $K_{yC}$, the lateral bending compliance $\epsilon$ and $G_{mz}$ of the torsional compliance ($1/G_{mz}$) are respectively a stiffness parameter against shear deformation of a tire, a stiffness parameter against lateral bending deformation, and a stiffness parameter against torsional deformation of the tire. A lateral direction in which the lateral force is generated designates an axial direction of a rotational axis of the tire. Therefore, in the case where the tire rotates to travel straight ahead, the lateral direction becomes identical with the right-left direction with respect to the travelling direction. On the other hand, in the case where the tire rotates at a slip angle, the lateral direction shifts with respect to the travelling direction of the tire by the slip angle. The longitudinal direction designates a direction, which is parallel to a road surface with which the tire comes into contact and perpendicularly crosses the axial direction of the rotational axis of the tire. A tire central axis (an axis CL in FIGS. 5A and 5B) is vertical to the road surface, perpendicularly crossing the rotational axis about which the tire rotates and passing on a central plane of the tire in a width direction.

The data input section 12 receives various data such as the measured data of the lateral force and the torque and the above-mentioned parameters and rewrites these data in a predetermined format so as to supply them to the processing section 16. At the same time, various data thus input are stored in a memory 21.

The processing section 16 makes the tire dynamic model computing section 14 to compute the lateral force and the torque in accordance with a sequence described below so as to determine various parameters or to determine the lateral force and the torque in equilibrium in the tire dynamic model.

The processing section 16 has four different sequences. Correspondingly to the respective sequences, the processing section 16 includes: a CP/SATP parameter calculating section 20 for determining various parameters described above from the measured data of the CP and the SATP; an $F_y/M_z$ parameter calculating section 22 for determining various parameters described above from the measured data of the lateral force and the torque; a CP/SATP data calculating section 24 for acquiring calculated data of the CF and the SATP in force equilibrium in the tire dynamic model; and an $F_y/M_z$ data calculating section 26 for acquiring calculated data of the lateral force and the torque in force equilibrium in the tire dynamic model. The functions of the CP/SATP parameter calculating section 20, the $F_y/M_z$ parameter calculating section 22, the CP/SATP data calculating section 24, and the $F_y/M_z$ data calculating section 26 will be described below.

The tire dynamic model computing section 14 uses various data supplied from the processing section 16 to calculate corresponding data (a lateral force $F_y'$ and a torque $M_z'$) of the lateral force and the torque based on the tire dynamic model. Then, the tire dynamic model computing section 14 returns the calculated values to the processing section 16 as the results of processing.

FIGS. 2, 3, 4A to 4C, 5A to 5D and 6A to 6C are diagrams for illustrating the tire dynamic model.

Figure 2:
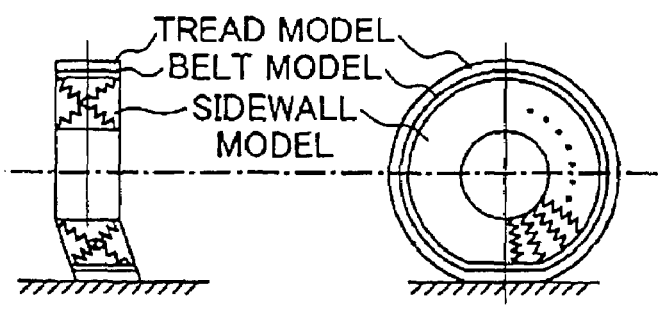
FIG. 2 is a diagram for illustrating a tire dynamic model used in the tire parameter deriving method and the tire cornering characteristic calculating method according to the present invention.

The tire dynamic model is constructed to include, as shown in FIG. 2: a sidewall model composed of a plurality of spring elements representing a spring characteristic of a sidewall on an assumed rigid cylindrical member; a belt model made of an elastic ring body connected to the spring elements; and a tread model composed of an elastic element representing a tread model connected onto a surface of the elastic ring body.

More specifically, in the tire dynamic model included in the tire dynamic element computing section 14, tire dynamic element parameters corresponding to various linear parameters and non-linear parameters obtained by organizing various spring elements of the tire are set as shown in FIG. 3. By inputting the slip angle $\alpha$, the lateral force $F_y$ and the torque $M_z$, the theoretical values of the lateral force and the torque (hereinafter, referred to respectively as the lateral force $F_y'$ and the torque $M_z'$) are calculated by the Formulae (1) to (6) in FIG. 3. It is apparent that, only when an error between the values of the input lateral force $F_y$ and torque $M_z$ and the values of the theoretical lateral force $F_y'$ and torque $M_z'$ is a predetermined value or less, that is, they are approximately identical with each other (converging and in mechanical equilibrium in the tire dynamic model), the lateral force $F_y'$ and the torque $M_z'$ are determined as values of the lateral force and the torque of the tire, which realize the mechanical equilibrium.

The linear parameters designate parameters represented in the Formulae (5) and (6) in a linear form, whereas the non-linear parameters designate parameters represented in the Formulae (5) and (6) in non-linear form.

The tire dynamic element computing section 14 calculates an twisting shift angle obtained by the input torque $M_z$ and the input torsional compliance ($1/G_{mz}$) based on the Formula (1). Then, the obtained twisting shift angle is subtracted from the given slip angle $\alpha$ to correct the slip angle, whereby an effective slip angle $\alpha_e$ is calculated. The reason why the effective slip angle $\alpha_e$ is calculated in this way is because the torque acts on the tire itself so as to reduce the given slip angle to twist the tire back in the case where the torque $M_z$ is larger than 0. Therefore, as shown in FIG. 4A, if the torque $M_z$ is larger than 0, the effective slip angle $\alpha_e$ is smaller than the actually given slip angle $\alpha$.

Furthermore, according to the Formula (2), a bias coefficient q for defining the profile of distribution of a contact pressure is calculated from the torque $M_z$. The bias coefficient q is a parameter indicating a profile of distribution of a contact pressure after the distribution of a contact pressure in a straight traveling state of the tire at the slip angle $\alpha=0$ (see FIG. 5A) is biased by the generation of the lateral force $F_y$ in a forward traveling direction (toward a leading edge on the contact patch) as shown in FIG. 5B. Assuming that the distribution of a contact pressure is p(t) (t is a position on the coordinates obtained by normalization with a contact length when a t-axis is defined in a backward traveling direction in FIGS. 5A and 5B), the profile of the distribution of the contact pressure p(t) is defined by a function $D_{gsp}$ (t; n, q) expressed by the Formula (7) in FIG. 5B.

Herein, a coefficient n in the function $D_{gsp}$ (t; n, q) defines the distribution of the contact pressure on the contact patch while the lateral force is being generated, and defines the distribution of the contact pressure so that the distribution becomes more angular (a curvature becomes larger) in the vicinity of the leading edge and a trailing edge of the distribution of the contact pressure as shown in FIG. 5C. Moreover, as shown in FIG. 5D, as the coefficient q increases from 0 to 1, the position of a peak of the distribution of the contact pressure is set so as to shift toward the leading edge side. As described above, the coefficients q and n are profile defining coefficients for defining the distribution profile of the contact pressure.

Furthermore, according to the Formula (3), a value $(x_c/l)$ indicating the degree of a shift of the center position of the tire toward the leading edge when the lateral force $F_y$ is generated is calculated in association with the torque $M_z$. Herein, l is a contact length. The reason why a shift of the center position O of the tire is defined in the Formula (3) is because the center position O serving as the center of rotation of the torque $M_z$ shifts toward the leading edge on the contact patch due to the generation of the lateral force $F_y$ as shown in FIG. 5B.

Furthermore, according to the Formula (4), a boundary position $(l_h/l)$ between a slip friction and an adhesive friction in the contact patch, which occur at the large slip angle α, is calculated. The boundary position $(l_h/l)$ is defined in the following manner.

Figure 6A:
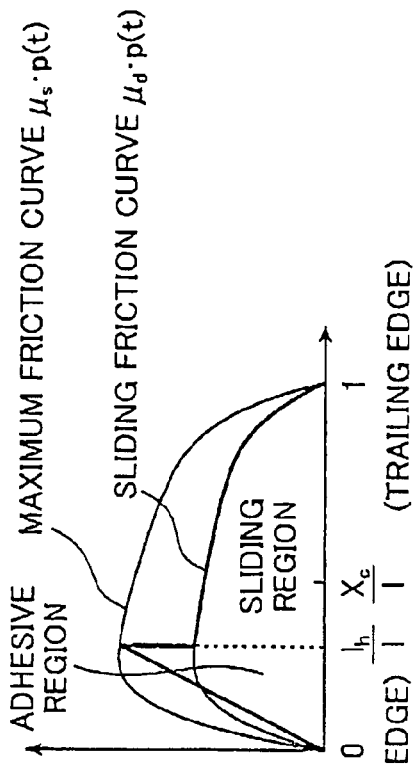
FIGS. 6A to 6C are further diagrams, each for illustrating the tire dynamic model used in the tire parameter deriving method and the tire cornering characteristic calculating method according to the present invention.
Figure 6B:
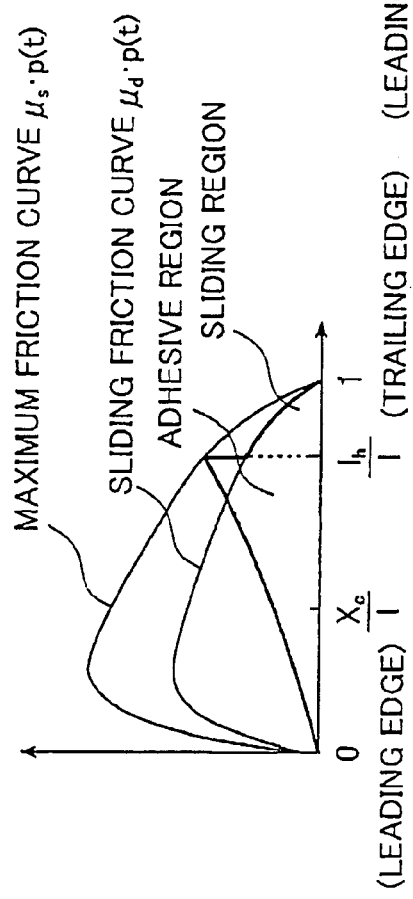
Figure 6C:
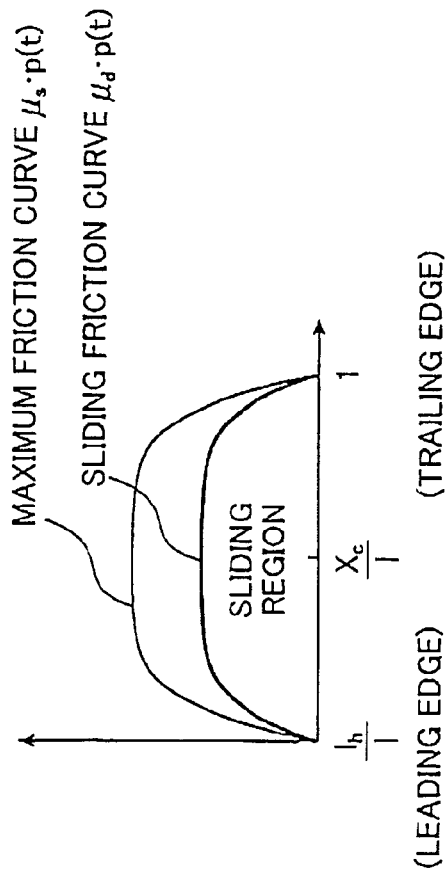

The maximum friction curves shown in FIGS. 6A to 6C are obtained by multiplying the adhesive friction coefficient $\mu_s$ by the contact pressure distribution p(t). The tire tread part, which comes into contact with the road surface on its leading edge, is gradually sheared by the road surface due to the slip angle α as it moves toward the trailing edge. As a result, a shear force (adhesive frictional force) is generated from the tire tread part. If the shear force gradually increases to reach the maximum friction curve, the tire tread part, which has been adhered to the road surface, starts sliding to generate a sliding frictional force in accordance with a sliding frictional curve obtained by multiplying the sliding friction coefficient $\mu_d$ by the contact pressure distribution p(t).

In FIG. 6A, the region on the leading edge side forward from the boundary position $(l_h/l)$ is an adhesive region in which the tire tread part is adhered to the road surface, whereas the region on the trailing edge side is a tire sliding region in which the tire tread part slides on the road surface. FIG. 6B shows the state where the slip angle α is larger than that shown in FIG. 5A. The boundary position $(l_h/l)$ moves toward the leading edge side as compared with FIG. 6A. If the slip angle α further increases, a sliding friction is generated at the position of the leading edge on the contact patch as shown in FIG. 6C.

As can be seen from FIGS. 6A to 6C, a ratio of the adhesive region and the sliding region greatly varies depending on the slip angle α. A frictional force in the adhesive region and the sliding region as described above, that is, a lateral force component is integrated along a tire width direction, whereby the lateral force $F_y$' can be calculated. Furthermore, by calculating a moment about the tire center O, the torque $M_z$' can be calculated.

In the Formulae (5) and (6), the lateral force $F_y$' and the torque $M_z$' are calculated separately for the adhesive region and the sliding region described above by using the effective slip angle $\alpha_c$.

The Formula (5) calculates the lateral force $F_y$' by getting the sum of two terms (two lateral force components). The first term corresponds to the integration within the integral range of 0 to $(l_h/l)$, representing an adhesive lateral force component generated in the adhesive region. The second term corresponds to the integration within the integral range of $(l_h/l)$ to 1, representing a sliding lateral force component generated in the sliding region.

In the Formula (6), the first term corresponds to the integration within the integral range of 0 to $(l_h/l)$, representing a torque component generated by the adhesive lateral force component generated in the adhesive region. The second term corresponds to the integration within the integral range of $(l_h/l)$ to 1, representing a torque component generated by the sliding lateral force component generated in the sliding region. In the Formula (6), in addition to the above-mentioned two torque components, another torque component, that is, a third term is provided. The third term, $A_x \cdot (l_h/l) \cdot \tan \alpha_e$, represents a torque component about the tire center O, which is generated by the amount of a shift of the contact patch of the tire and a longitudinal force of the tire when the contact patch of the tire has a lateral shift due to the presence of the slip angle α as described below. More specifically, the torque $M_z$' is calculated by the sum of three torque components, i.e., the torque component generated by the adhesive lateral force, the torque component generated by the sliding lateral force and the torque component generated by the longitudinal force.

The adhesive lateral force component in the first term of the Formula (5) corresponds to the lateral force in the adhesive region. In the Formula (5), the adhesive lateral force component is calculated by representing the state where lateral displacement of the tread part caused by the effective slip angle $\alpha_e$ is reduced by the lateral bending deformation of the belt part.

The sliding lateral force component in the second term corresponds to the lateral force in the sliding region. In the Formula (5), the profile of the contact pressure distribution p(t) generated by the effective slip angle $\alpha_e$ is expressed by the function $D_{gsp}$ (t;n, q) so as to calculate the sliding lateral force component.

FIGS. 4A to 4C show the relation between the effective slip angle $\alpha_e$, the adhesive lateral force component reduced by deformation of the belt part, the longitudinal force component and the torque component, schematically illustrating the contact patch.

FIG. 4A shows the state where, when the slip angle α is given, the toque generated by the slip angle α acts on the tire itself so as to reduce the slip angle α to the effective slip angle $\alpha_e$. FIG. 4B shows the relation between the lateral displacement caused by the effective slip angle $\alpha_e$ and the lateral displacement caused by the lateral bending deformation of the belt. FIG. 4C shows a mechanism in which the longitudinal force distribution generated by a lateral shift of the contact patch of the tire due to the lateral force contributes to the torque $M_z$'. In FIG. 4C, $M_{z1}$ and $M_{z2}$ represent a torque component by the adhesive lateral force component and a torque component by the sliding lateral force component, and $M_{z3}$ is a torque component by the longitudinal force acting on the contact patch.

Figure 7:
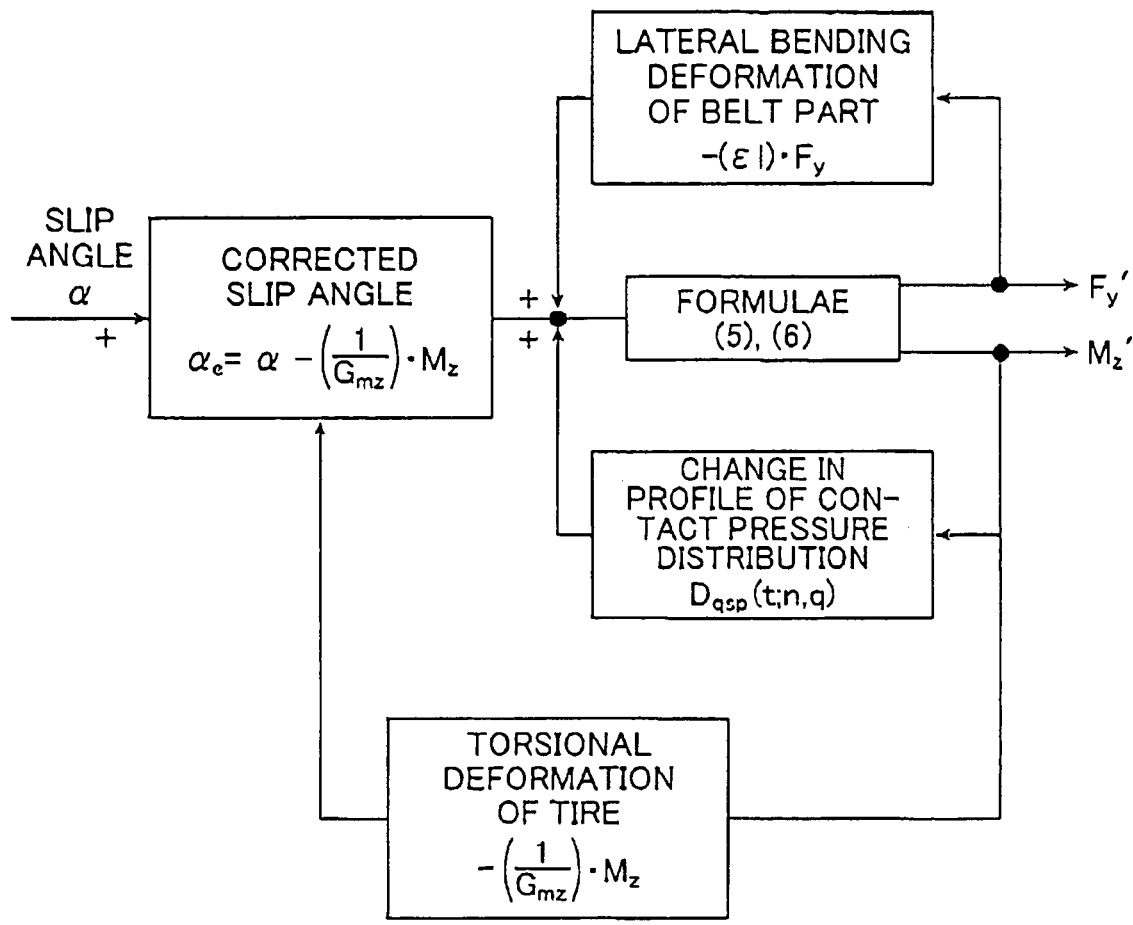
FIG. 7 is a processing block diagram showing steps up to the point where a lateral force and a torque are calculated in the tire dynamic model used in the tire parameter deriving method and the tire cornering characteristic calculating method according to the present invention.

FIG. 7 is a processing block diagram until the lateral force $F_y$' and the torque $M_z$' are calculated based on the tire dynamic model after the slip angle α is given. As can be seen from FIG. 7, in the tire dynamic model according to the present invention, for the calculation of the lateral force $F_y$' and the torque $M_z$', the lateral bending deformation of the belt part, a variation in the profile of the contact pressure and the torsional deformation of the tire are fed back so as to calculate the lateral force $F_y$' and the torque $M_z$' according to the Formulae (5) and (6). In this case, the given lateral force $F_y$ and torque $M_z$ are used for the lateral bending deformation of the belt part, a variation in the profile of the contact pressure and the torsional deformation of the tire, which are used to calculate the lateral force $F_y'$ and the torque $M_z'$.

The lateral force $F_y'$ and the torque $M_z'$ calculated in the tire dynamic model computing section 14 are not necessarily identical with the given lateral force $F_y$ and torque $M_z$. However, by sequence processing performed in the CP/SATP parameter calculating section 20, the $F_y/M_z$ parameter calculating section 22, the CP/SATP data calculating section 24 and the $F_y/M_z$ data calculating section 26 described below, the lateral force $F_y$ and the torque $M_z$ are searched so that the given lateral force $F_y$ and torque $M_z$ become approximately identical (in mechanical equilibrium) with the calculated lateral force FY and torque $M_z'$ in the tire dynamic model. As a result, the lateral force and the torque in equilibrium in the tire dynamic model are calculated.

Hereinafter, how to process in the CF/SATP parameter calculating section 20, the $F_y/M_z$ parameter calculating section 22, the CP/SATP data calculating section 24 and the $F_y/M_z$ data calculating section 26 will be described.

The CP/SATP parameter calculating section 20 derives the above-mentioned linear parameters and non-linear parameters so that an error between the lateral force $F_y$ and the torque $M_z$ measured at the slip angle $\alpha=1$ degree, and the lateral force $F_y'$ and the torque $M_z'$ is a predetermined value or less, that is, the lateral force and the torque is in mechanical equilibrium in the tire dynamic model.

Figure 8:
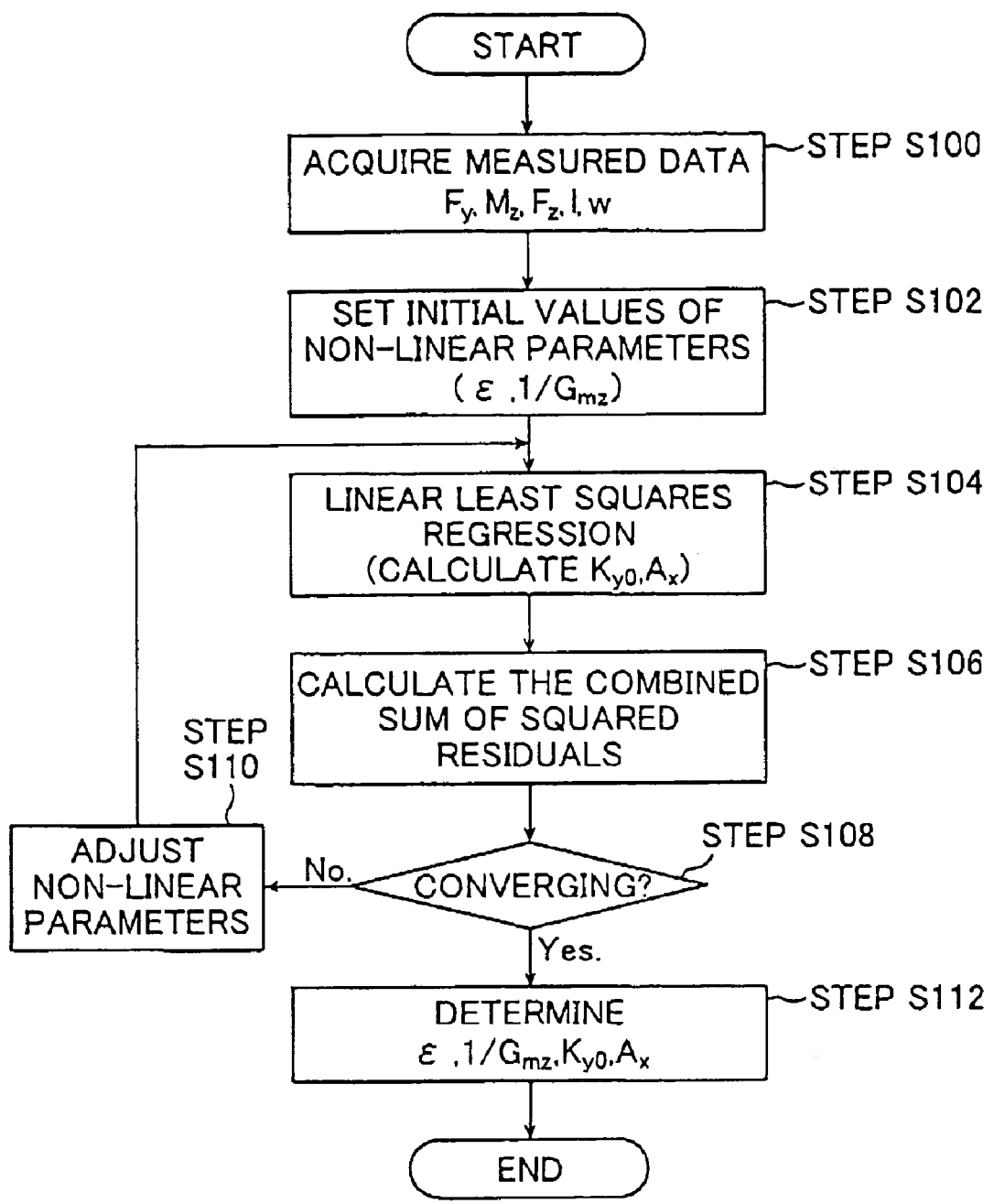
FIG. 8 is a flowchart showing a flow of processing executed in the tire parameter deriving method according to the present invention.

FIG. 8 shows a flow of processing executed in the CP/SATP parameter calculating section 20.

More specifically, the measured data of the lateral force $F_y$ and the torque $M_z$ at the slip angle $\alpha=1$ degree, the applied load $F_z$ and the measured data of the contact length l and the contact width w of the tire in a non-rolling state under the applied load $F_z$ are acquired (step S100).

Furthermore, the lateral bending compliance $\epsilon$ and the torsional compliance $(1/G_{mz})$ are initialized to predetermined values (step S102).

Next, the lateral stiffness $K_{y0}$ and the longitudinal stiffness $A_x$ corresponding to the linear parameters are calculated using the initialized values of the lateral bending compliance $\epsilon$ and the torsional compliance $(1/G_{mz})$ by a known technique, i.e., linear least squares regression (step S104). On the contact patch at the slip angle $\alpha=1$ degree, it is assumed that the shape of the contact catch is rectangular and a density of the longitudinal force acting on the contact patch is uniform to be proportional to an average contact pressure. Then, the lateral stiffness $K_{y0}$ and the longitudinal stiffness $A_x$ are defined by the proportional relation with the calculated values obtained by using the contact length l, the contact width w and the applied load $F_z$. Then a proportional factor of the proportional relation at this time serves as a parameter characterizing the values of the lateral stiffness $K_{y0}$ and the longitudinal stiffness $A_x$.

$$K_{y0} \propto w \cdot l^2 / 2$$

$$A_x \propto Fz \cdot 1/2$$

Since the non-linear parameters are set to the predetermined values, a normal equation for the lateral stiffness $K_{y0}$ and the longitudinal stiffness $A_x$ corresponding to the linear parameters can be established. By solving the normal equation, the lateral stiffness $K_{y0}$ and the longitudinal stiffness $A_x$ corresponding to the linear parameters can be uniquely calculated. Specifically, a normal equation for the lateral stiffness $K_{y0}$ and the longitudinal stiffness $A_x$ corresponding to the linear parameters is created from the expression of the sum of squared residuals using the set non-linear parameters so that the lateral force $F_y'$ and the torque $M_z'$ calculated by the Formulae (5) and (6) optimally regress to the measured lateral force $F_y$ and torque $M_z$. By solving the thus obtained normal equation, the lateral stiffness $K_{y0}$ and the longitudinal stiffness $A_x$ are calculated. Herein, the normal equation is an equation for the linear parameter, which is obtained by partially differentiating the equation defining the sum of squared residuals by each of the linear parameters of the lateral stiffness $K_{y0}$ and the longitudinal stiffness $A_x$ to get a partial differential value of 0. The number of created normal equations corresponds to the number of linear parameters.

Next, the acquired measured data, the calculated linear parameters and the initialized non-linear parameters are supplied to the tire dynamic model computing section 14. In the tire dynamic model computing section 14, by supplying the measured data, the linear parameters and the non-linear parameters, the lateral force $F_y'$ and the torque $M_z'$ at the slip angle $\alpha=1$ degree are calculated in accordance with a flow of the processing block diagram in FIG. 7. Since the slip angle $\alpha$ is 1 degree in this case, the contact pressure distribution is such that a coefficient n of the contact pressure distribution at the slip angle $\alpha=0$ degree is fixed and, in addition, the bias coefficient q is set to 0. Furthermore, the boundary position $(l_H/l)$ between the adhesive region and the slip region set to 1. More specifically, the contact patch does not include any slip region but is the adhesive region in its entirety. Therefore, the slip lateral force component in the second term in the Formulae (5) and (6) and the torque component generated by the slip lateral force component are both 0. Moreover, since the contact length l is supplied as the measured data, in place of the effective contact length $l_e$ corresponding to the linear parameter in FIG. 2, a function of the contact length obtained by regressing the measured contact length l is used. The function is an exponential function of the applied load $F_z$, that is, a function having the applied load $F_z$ dependency is used.

Herein, the contact width w is a lateral width of the tire tread part. Tire grooves forming a tread pattern are provided on the tread part. Therefore, since an actual contact region which is actually in contact with the road surface differs from a total contact region of the tread part, the contact width w, which is corrected by using a ratio of the actual contact region to the total contact region, is used.

Next, the lateral force $F_y'$ and the torque $M_z'$ which are the corresponding calculated data of the lateral force and the torque at the slip angle $\alpha=1$ degree calculated in the tire dynamic model computing section 14 are returned to the CP/SATP parameter calculating section 20. By using the calculated data of the lateral force $F_y'$ and the torque $M_z'$ and the measured data of the lateral force $F_y$ and the torque $M_z$ at the slip angle $\alpha=1$ degree, the combined sum of squared residuals $Q_c$ expressed by the following Formula (8) is calculated (step S106).

$$Q_c = g_f \cdot \sum_{i=1}^{N} (F_{yi} - F'_{yi})^2 + g_m \cdot \sum_{i=1}^{N} (M_{zi} - M'_{zi})^2 \qquad (8)$$

In the above Formula (8), N is the number of set loading conditions in which the applied load varies, and i is an integer from 1 to N. Moreover, $g_f$ and $g_m$ are coefficients expressed by the following Formulae, respectively, assuming that variances of the lateral force $F_y$ and the torque $M_z$ under N loading conditions for the measured data of the lateral force $F_y$ and the torque $M_z$ are $\sigma_f^2$ and $\sigma_m^2$. The coefficients $g_f$ and $g_m$ are weighting coefficients used for obtaining the combined sum of squared residuals $Q_c$.

$g_f = 1/\sigma_f^2$ $g_m = 1/\sigma_m^2$

More specifically, the combined sum of squared residuals $Q_c$ is obtained by weighted addition of the respective sums of the square residuals of the lateral force and the torque, using inverse numbers of variances corresponding to information of variations in the measured data as weighting coefficients.

As described above, the combined sum of squared residuals is calculated by adding the results of multiplication of the sum of squared residuals of the value of the lateral force $F_y$ of the measured data and the value of the lateral force $F_y'$ of the calculated data by the weighting coefficient $g_f$ to the results of multiplication of the sum of squared residuals of the value of the torque $M_z$ of the measured data and the value of the torque $M_z'$ of the calculated data by the weighting coefficient $g_m$.

The combined sum of squared residuals is herein used so as to get an optimal match between the lateral force $F_y'$ and the torque $M_z'$ under a plurality of loading conditions and the corresponding lateral force $F_y$ and the torque $M_z$ when the non-linear parameters are calculated.

Furthermore, it is determined whether or not the combined sum of squared residuals converges to be a predetermined value or less (step S108).

If it is determined that the combined sum of squared residuals does not converge, the previously set non-linear parameters, that is, the lateral bending compliance $\epsilon$ and the torsional compliance ($1/G_{mz}$) are adjusted (step S110) The non-linear parameters are adjusted in accordance with, for example, a Newton-Raphson method. More specifically, the combined sum of squared residuals is subjected to quadratic partial differential for the non-linear parameters so as to obtain an equation associating a matrix and the amount of adjustment of the non-linear parameters with each other. By solving the equation for the above-mentioned amount of adjustment, the amount of adjustment of the non-linear parameters is calculated. This calculation method is described in detail in Japanese Patent Application No. 2001-242059 (corresponding to JP 2003-57134 A) by the applicant of the present invention.

Each time the non-linear parameters are adjusted, the linear least squares regression (step S104) for the linear parameters and the calculation for the combined sum of squared residuals (step S106) are performed so as to obtain the combined sum of squared residuals according to the Formula (8). Then, the non-linear parameters are repeatedly adjusted until the combined sum of squared residuals becomes a predetermined value or less.

When the combined sum of squared residuals becomes a predetermined value or less, the lateral stiffness $K_{y0}$ and the longitudinal stiffness $A_x$ which are calculated by the linear least squares regression and the lateral bending compliance e and the torsional compliance ($1/G_{mz}$) corresponding to the non-linear parameters are determined as parameters (step S112). The determined parameters are stored in the memory 20.

The flow of calculation of the linear parameters and the non-linear parameters at the slip angle $\alpha$=1 degree using the tire dynamic model, which is executed by the CP/SATP parameter calculating section 20, has been described above.

The $F_y/M_z$ parameter calculating section 22 calculates the above-mentioned linear parameters and non-linear parameters so that the lateral force $F_y'$ and the torque $M_z'$ generated under the condition that the contact patch includes both the adhesive region and the sliding region while the slip angle $\alpha$ is varied, for example, from 0 to 20 degrees, are identical with the measured lateral force $F_y$ and torque $M_z$.

Figure 9:
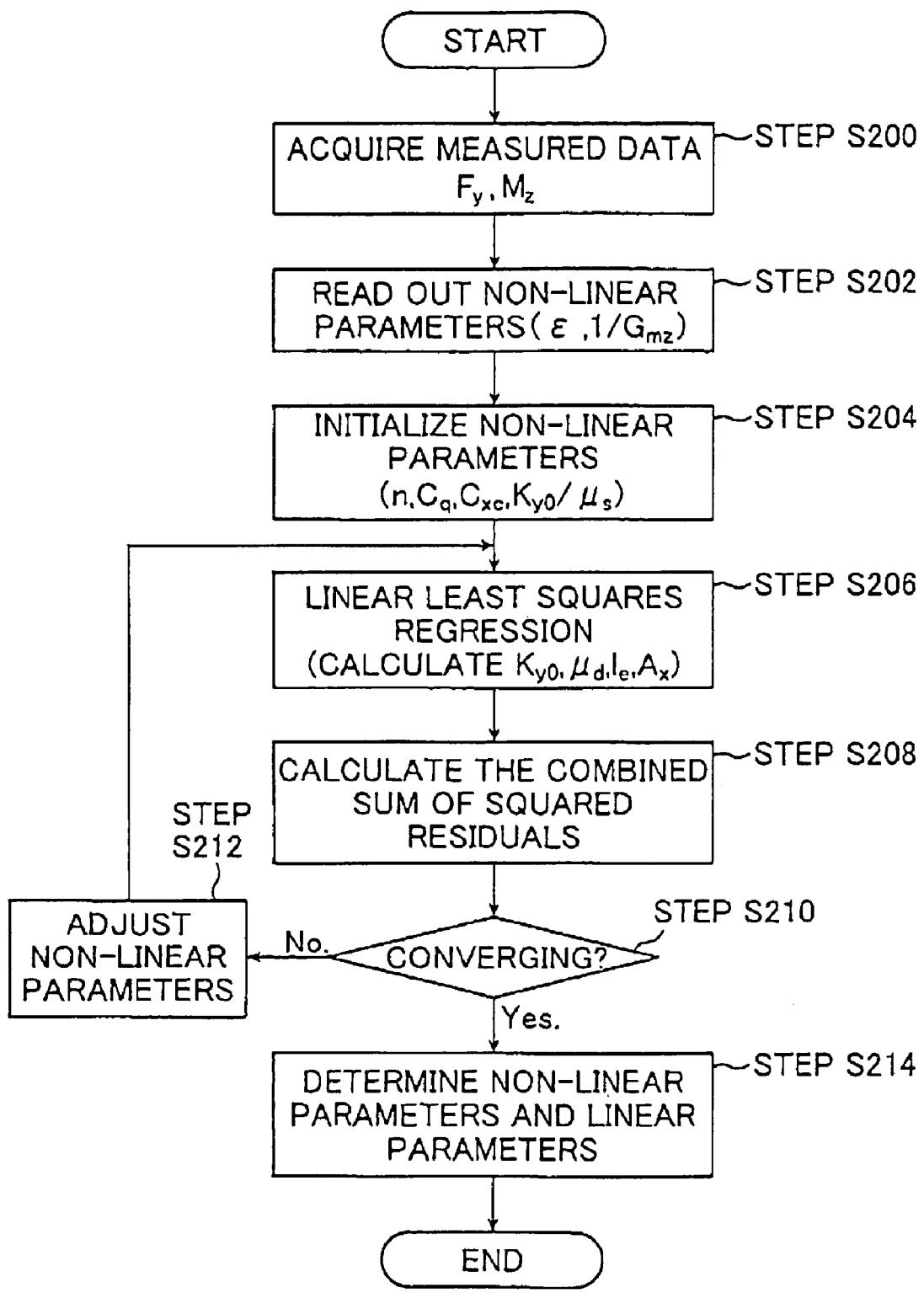
FIG. 9 is a flowchart showing another flow of processing executed in the tire parameter deriving method according to the present invention.

FIG. 9 shows a flow of processing executed in the $F_y/M_2$ parameter calculating section 22.

More specifically, as shown in FIG. 9, the measured data of the lateral force $F_y$ and the torque $M_z$, which are measured while varying the slip angle under a constant applied load, are acquired (step S200).

Furthermore, the lateral bending compliance $\epsilon$ and the torsional compliance ($1/G_{mz}$), which are obtained in the above-mentioned CP/SATP parameter calculating section 20 and stored in the memory 20, are read out so as to set the parameters (step S202).

Furthermore, the remaining non-linear parameters, that is, the coefficient n, the lateral stiffness coefficient ($K_{y0}/\mu_s$), the coefficient $C_c$ and the shift coefficient $C_{xc}$ are initialized to predetermined values (step S204).

Next, linear least squares regression is performed by using the measured data of the measured lateral force $F_y$ and torque $M_z$ and the initialized non-linear parameters (step S206). More specifically, a normal equation for the linear parameters such as the lateral stiffness $K_{y0}$ and the longitudinal stiffness $A_x$ is created. By solving the normal equation, the lateral stiffness $K_{y0}$, the longitudinal stiffness $A_x$, the sliding friction coefficient $\mu_d$ and the effective contact length $l_e$ are calculated. Specifically, the linear least squares regression is performed. Herein, the normal equation is an equation for the linear parameters, which is obtained by partially differentiating the sum of squared residuals by the respective linear parameters to get a partial differential value of 0. The number of created normal equations corresponds to the number of linear parameters.

The thus initialized non-linear parameters, the linear parameters calculated by using the normal equations and the measured data are supplied to the tire dynamic model computing section 14. The supply of these parameters and measured data allows the lateral force $F_y'$ and the torque $M_z'$ at each slip angle $\alpha$ to be calculated in accordance with a flow of the block diagram of FIG. 7.

Next, by using the calculated data of the calculated lateral force $F_y'$ and torque $M_z'$ and the measured data of the lateral force $F_y$ and the torque $M_z$ at the given slip angle $\alpha$, the combined sum of squared residuals $Q_c$ expressed by the above Formula (8) is calculated (step S208). In this case, N in the Formula (8) is the number of set conditions of the given slip angle a. The weighting coefficients $g_f$ and $g_m$ in this case are obtained from variances of the lateral force $F_y$ and the torque $M_z$ of the measured data under N conditions of the slip angle.

As described above, the combined sum of squared residuals is obtained by adding the results of multiplication of the sum of squared residuals of the lateral force $F_y$ of the measured data and the lateral force $F_y'$ of the calculated data by the weighting coefficient $g_f$ to the results of multiplication of the sum of squared residuals of the torque $M_z$ of the measured data and the torque $M_z'$ of the calculated data by the weighting coefficient $g_m$. The combined sum of squared residuals is used in this case so as to get a simultaneous match between the lateral force $F_y'$ and the torque $M_z'$ under a plurality of conditions of the slip angle and the lateral force $F_y$ and the torque $M_z$, respectively, in the calculation of the non-linear parameters, which is the same as in the above-mentioned case.

It is determined if the combined sum of squared residuals converges to be a predetermined value or less (step S210).

If it is determined that the combined sum of squared residuals does not converge, the non-linear parameters initialized at the step S204 are adjusted (step S212). The non-linear parameters are adjusted in accordance with, for example, a Newton-Raphson method.

In the example shown in FIG. 9, the lateral bending compliance $\epsilon$ and the torsional compliance $(1/G_{mz})$ corresponding to the non-linear parameters are read out from the memory 20 so as to be used as the determined non-linear parameters. In the present invention, however, the non-linear parameters, i.e., the lateral bending compliance $\epsilon$ and the torsional compliance $(1/G_{mz})$ may be regarded as undetermined parameters so as to be initialized, similarly to the other non-linear parameters. However, if the non-linear parameters of the lateral bending compliance $\epsilon$ and the torsional compliance $(1/G_{mz})$ are already calculated in the CP/SATP parameter calculating section 20, it is preferred to use the calculated values of the lateral bending compliance $\epsilon$ and the torsional compliance $(1/G_{mz})$ so as to get a match between the values of the parameters obtained in the CP/SATP parameter calculating section 20 and the values of the parameters obtained in the $F_y/M_z$ parameter calculating section 22.

The non-linear parameters are repeatedly adjusted until it is determined that the combined sum of squared residuals converges at the step S 210. The linear least squares regression for the linear parameters (step S 206) and the calculation of the combined sum of squared residuals (step S 20) are performed each time the adjustment is performed so as to obtain the combined sum of squared residuals according to the Formula (8). Then, until the combined sum of squared residuals becomes a predetermined value or less, the non-linear parameters are repeatedly adjusted. When the combined sum of squared residuals becomes a predetermined value or less, each of the linear parameters such as the lateral stiffness $K_{y0}$ and the longitudinal stiffness $A_x$ calculated by the linear least square regression is determined (step S 214). Then, these parameters are stored in the memory 20.

The flow of calculation of the linear parameters and the non-linear parameters at each slip angle $\alpha$ using the tire dynamic model, which is executed by the $F_y/M_z$ parameter calculating section 22, has been described above.

The CP/SATP data calculating section 24 calculates the lateral force $F_y'$ and the torque $M_z'$ under loading conditions with different applied loads at the slip angle $\alpha=1$ degree by using the linear-parameters and non-linear parameters calculated in the CP/SATP parameter calculating section 20.

Figure 10:
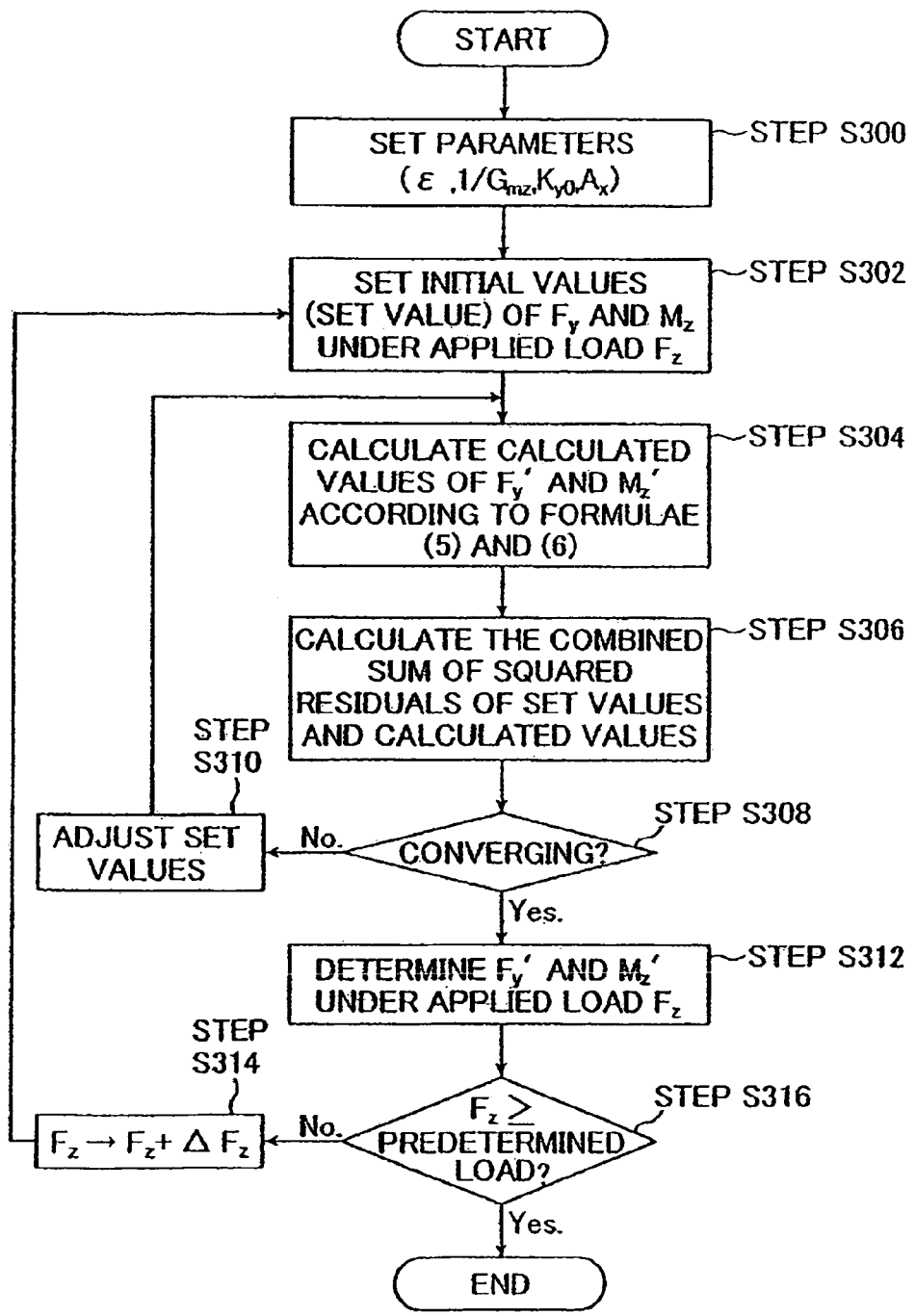
FIG. 10 is a flowchart showing a flow of processing executed in the tire cornering characteristic calculating method according to the present invention.

FIG. 10 shows a flow of processing executed in the CP/SATP data calculating section 24.

More specifically, as shown in FIG. 10, the CP/SATP data calculating section 24 first reads out and sets the linear parameters and the non-linear parameters calculated in the CP/SATP parameter calculating section 20 (step S300).

Furthermore, the lateral force $F_y$ and the torque $M_z$ under the applied load $F_z$ are initialized (step S302).

Thereafter, the linear parameters and the non-linear parameters are supplied to the tire dynamic model computing section 14 together with the slip angle $\alpha=1$ degree and the initialized lateral force $F_y$ and torque $M_z$. In the tire dynamic model computing section 14, the supplied linear parameters and non-linear parameters and the initialized lateral force $F_y$ and torque $M_z$ are used to calculate the lateral force $F_y'$ and the torque $M_z'$ in accordance with the Formula (5) and (6) in FIG. 3 (step S304).

In this case, since the slip angle $\alpha=1$ degree, the coefficient n of the contact pressure distribution at the slip angle $\alpha=0$ degree is fixed for the contact pressure distribution. Furthermore, the bias coefficient q is set to 0. Moreover, the boundary position $(l_h/l)$ between the adhesive region and the slip region is set to 1. More specifically, the contact patch does not include any sliding region but is an adhesive region in its entirety. Therefore, the sliding lateral force component in the second term and the torque component generated by the sliding lateral force component in the Formulae (5) and (6) are both 0. Moreover, since the contact length l is supplied as the measured data, the contact length l is used as a stipulated value in place of the effective contact length $l_c$ corresponding to the linear parameter in FIG. 3.

The thus calculated lateral force $F_y'$ and torque $M_z'$ at the slip angle $\alpha=1$ degree are returned to the CP/SATP data calculating section 24. The CP/SATP data calculating section 24 calculates the combined sum of squared residuals of the set values of the lateral force $F_y$ and the torque $M_z$ supplied to the tire dynamic model computing section 14 and the calculated values of the lateral force $F_y'$ and the torque $M_z'$ in accordance with the Formula (8) (step S306).

Next, it is determined if the combined sum of squared residuals converges to be a predetermined value or less (step S308).

If it is determined that the combined sum of squared residuals does not converge, the set values of the previously set lateral force $F_y$ and torque $M_z$ are adjusted (step S 310). The adjusted lateral force $F_y$ and torque $M_z$ are supplied again to the tire dynamic model computing section 14 together with the non-linear parameters and the linear parameters.

In this manner, the set values of the lateral force $F_y$ and torque $M_z$ are adjusted until the combined sum of squared residuals converges to be a predetermined value or less. The set values are adjusted in accordance with, for example, the above-mentioned Newton-Raphson method. In this manner, the converging lateral force $F_y'$ and torque $M_z'$ are determined (step S312)

Furthermore, the condition of the applied load $F_z$ is changed (step S314). Each time the applied load $F_z$ is changed, the lateral force $F_y$ and the torque $M_z$ are initialized (step S302). By using the set values, the lateral force $F_y'$ and the torque $M_z'$ are calculated (step S304) so as to calculate the combined sum of squared residuals (step S306). Then, it is determined if the combined sum of squared residuals converges (step S308).

In this manner, the condition of the applied load $F_z$ is repeatedly changed until the applied load $F_z$ becomes a predetermined load (step S316). Each time the applied load $F_z$ is changed, the lateral force $F_y'$ and the torque $M_z'$ are calculated so as to determine the converging lateral force $F_y'$ and torque $M_z'$. The determined lateral force $F_y'$ and torque $M_z'$ are stored in the memory 20.

In this manner, characteristic curves of the CP and the SATP corresponding to the lateral force and the torque at the slip angle $\alpha=1$ degree with respect to the applied load $F_z$ are obtained.

The $F_y/M_z$ data calculating section 26 calculates the lateral force $F_y'$ and the torque $M_z'$ at a plurality of slip angles $\alpha$ under a predetermined applied load by using the linear parameters and the non-linear parameters calculated in the $F_y/M_z$ parameter calculating section 22.

Figure 11:
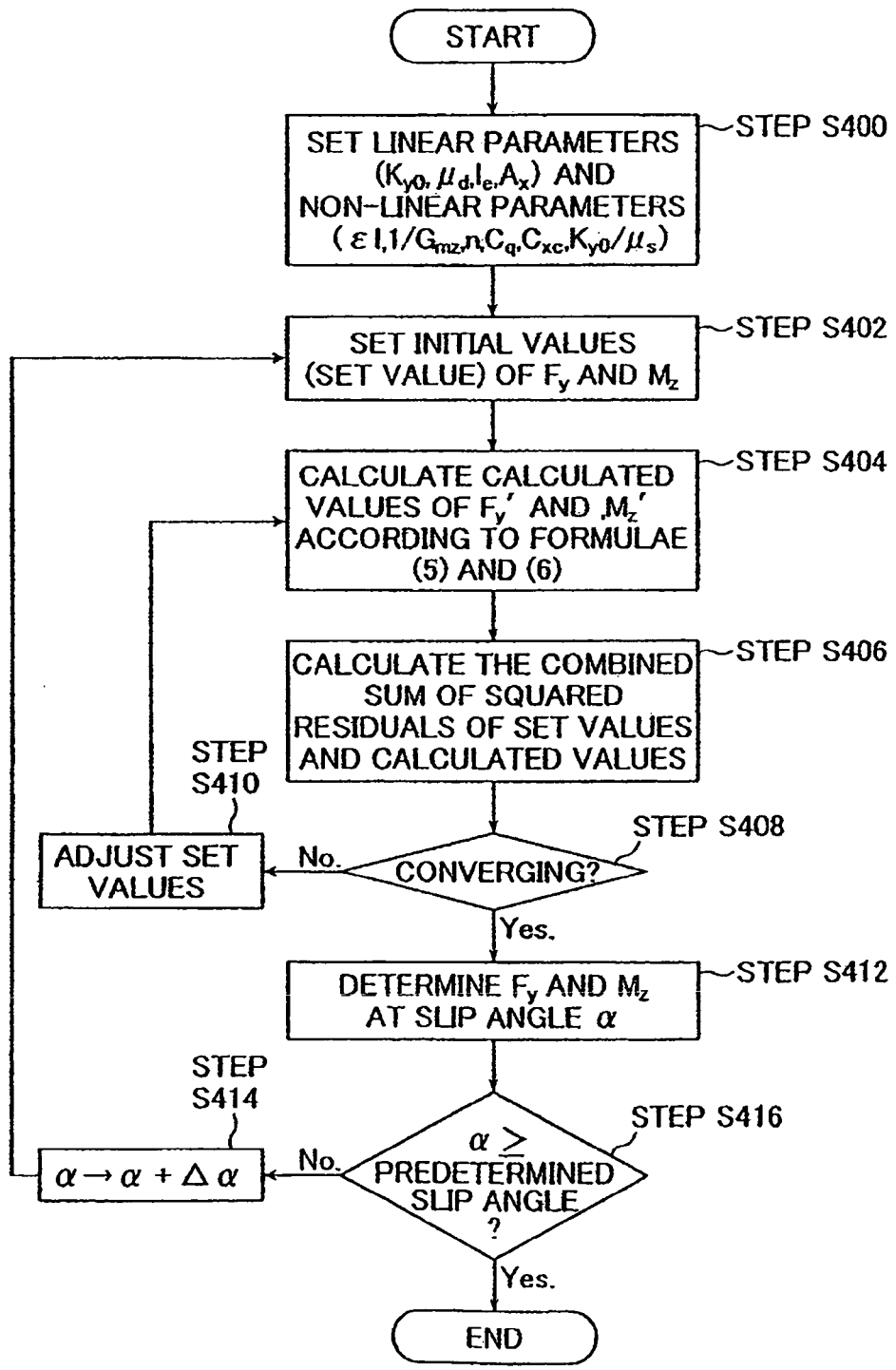
FIG. 11 is a flowchart showing another flow of processing executed in the tire cornering characteristic calculating method according to the present invention.

FIG. 11 shows a flow of processing executed in the $F_y/M_z$ data calculating section 26.

The $F_y/M_z$ data calculating section 26 first reads out and sets the linear parameters and the non-linear parameters calculated in the $F_y/M_z$ parameter calculating section 22 (step S400).

Furthermore, the $F_y/M_z$ data calculating section 26 initializes the lateral force $F_y$ and the torque $M_z$ under the applied load $F_z$ (step S402).

Thereafter, the linear parameters, the non-linear parameters and the initialized lateral force $F_y$ and torque $M_z$ are supplied to the tire dynamic model computing section 14 together with the set slip angle α=Δα. In the tire dynamic model computing section 14, the supplied linear parameters and non-linear parameters and the initialized lateral force $F_y$ and torque $M_z$ are used to calculate the lateral force $F_y'$ and the torque $M_z'$ in accordance with the Formulae (5) and (6) (step S404).

The thus calculated lateral force $F_y'$ and torque $M_z'$ are returned to the $F_y/M_z$ data calculating section 26. The $F_y/M_z$ data calculating section 26 calculates in accordance with the Formula (c) the combined sum of squared residuals of the set values of the lateral force $F_y$ and the torque $M_z$ supplied to the tire dynamic model computing section 14 and the calculated values of the calculated lateral force $F_y'$ and torque $M_z'$ (step S406)

Next, it is determined if the combined sum of squared residuals converges to be a predetermined value or less (step S408).

If it is determined that the combined sum of squared residuals does not converge, the previously set values of the lateral force $F_y$ and the torque $M_z$ are adjusted (step S 410). The adjusted lateral force $F_y$ and torque $M_z$, the non-linear parameters and the linear parameters are supplied again to the tire dynamic model computing section 14.

In this manner, the set values of the lateral force $F_y$ and torque $M_z$ are adjusted until the combined sum of squared residuals converges to be a predetermined value or less. The set values are adjusted in accordance with, for example, the above-mentioned Newton-Raphson method. In this manner, the lateral force $F_y'$ and torque $M_z'$ are determined (step S412).

Next, it is determined whether or not the slip angle α is a predetermined slip angle or smaller (step S416).

If it is determined that the slip angle α is a predetermined angle or smaller, she condition of the slip angle α is changed (α to α+Δα) (step S414). Then, the initial values of the lateral force $F_y$ and the torque $M_z$ at the changed slip angle α are set (step S402). Then, the lateral force $F_y'$ and the torque $M_z'$ are calculated (step S404), the combined sum of squared residuals is calculated (step S406), and it is determined if the combined sum of squared residuals converges (step S408).

The slip angle α is therefore repeatedly changed until the slip angle α becomes a predetermined slip angle (step S416). Each time the slip angle is changed, the lateral force $F_y'$ and the torque $M_z'$ are calculated so as to determine the converging lateral force $F_y'$ and torque $M_z'$. The determined lateral force $F_y'$ and torque $M_z'$ are stored in the memory 20.

In this manner, characteristic curves of the lateral force and the torque with respect to the slip angle α are obtained.

The structures and how to process in the processing section 16 and the tire dynamic model computing section 24 have been described above. Each of the CP/SATP parameter calculating section 20, the $F_y/M_z$ parameter calculating section 22, the CP/SATP data calculating section 24 and the $F_y/M_z$ data calculating section 26 may alternatively be constituted by a sub-routine or a sub-program when the computing unit 10 is constituted by a computer so that the processing in each section is executed by software processing. Further alternatively, at least one of the. CP/SATP parameter calculating section 20, the $F_y/M_z$ parameter calculating section 22, the CF/SATP data calculating section 24 and the $F_y/M_z$ data calculating section 26 may be incorporated into the computing unit 10 as a sub-routine or a sub-program.

The above-mentioned sub-routine or sub-program includes, for example: a data acquisition procedure for allowing a computer to acquire the measured data including the lateral force $F_y$ and the torque $M_z$ of the tire under a plurality of measurement conditions so as to cause the computer to store them in the memory 20 of the computer; and a parameter deriving procedure for allowing the computing section of the computer to derive the linear parameters and the non-linear parameters so that the combined sum of squared residuals $Q_c$ of the respective measured data of the lateral force $F_y$ and the torque $M_z$ stored in the memory 20 and the lateral force $F_y'$ and the torque $M_z'$ calculated by the tire dynamic model becomes the smallest.

The tire dynamic model in the sub-routine or the sub-program described above is an analytic model for calculating the self-aligning torque separately as a lateral force-based torque component generated by the lateral force acting on the contact patch of the tire and a longitudinal force-based torque component generated by the longitudinal force acting on the contact patch of the tire. In this case, the above-mentioned sub-routine or sub-program may includes: a data acquisition procedure for allowing a computer to acquire the measured data including the data of the lateral force $F_y$ and the torque $M_z$ the tire under a plurality of measurement conditions so as to cause the computer to store them in the memory 20 of the computer; and a parameter deriving procedure for allowing the computing section of the computer to derive the self adjusting torque separately as the lateral torque component and the longitudinal torque component so that an error between the respective measured data of the lateral force $F_y$ and the torque $M_z$ stored in the memory 20 and the lateral force $F_y'$ and the torque $M_z'$ calculated by the tire dynamic model becomes the smallest. It is apparent that the error in the parameter deriving procedure in this case may be the combined sum of squared residuals $Q_c$ expressed by the above Formula (8). In such a case, the lateral force $F_y'$ and the torque $M_z'$ are calculated by using the effective slip angle $α_e$.

Figure 12:
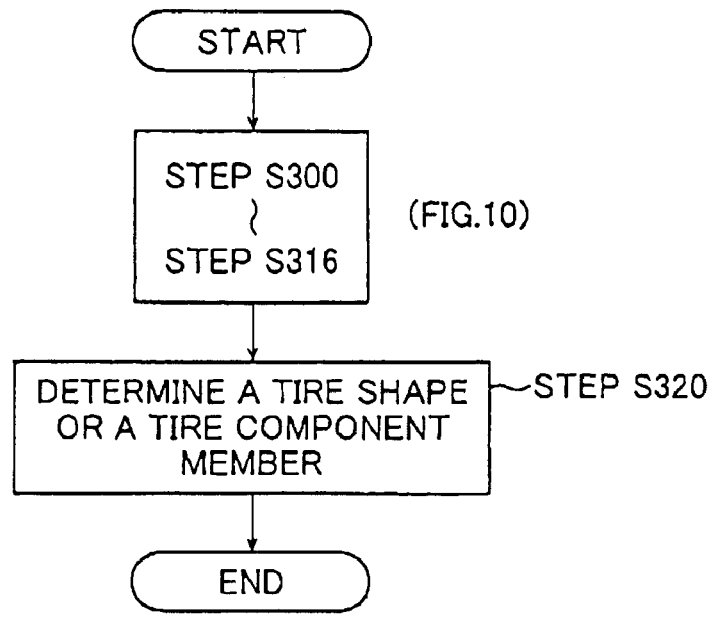
FIG. 12 is a flowchart showing a flow of processing executed in the tire designing method according to the present invention.

Furthermore, in the CP/SATP data calculating section 24 and the $F_y/M_z$ data calculating section 26, the characteristic curves of load dependency of the CP and the SATP or the characteristic curves of slip angle dependency of $F_y'$ and $M_z'$ can be calculated for evaluation. In accordance with the results of evaluation, as FIG. 12 describes, a tire can be designed to determine the shape of a tire or the construction of tire parts for realizing the set parameter values (step S320). The reason why the design method is advantageous is as follows. Since the tire dynamic element parameters constituting the above-mentioned tire dynamic model reflect the construction of the tire parts, the values of the dynamic element parameters and the shape of a tire or the type of tire part for realizing the values can be correlated with each other. Therefore, the correlation between the dynamic element parameters and the shape of a tire or the construction of the tire parts can be predefined so that the shape of the tire or the construction of the tire part for realizing the dynamic element parameters of a tire is selected from the determined dynamic element parameters so as to be used for tire designing.

Figure 13:
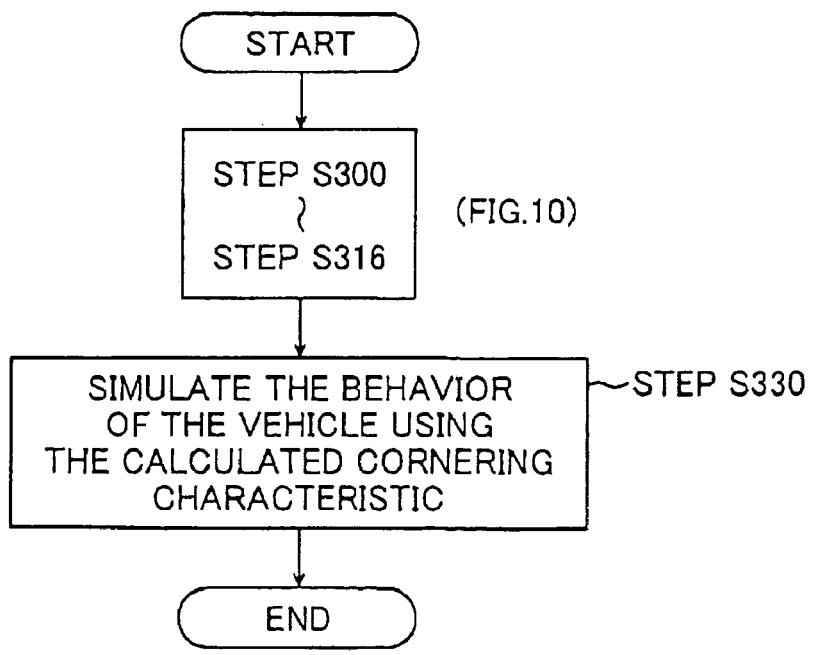
FIG. 13 is a flowchart showing a flow of processing executed in the vehicle dynamics analyzing method according to the present invention.

Alternatively, as FIG. 13 describes, the calculated characteristic curves of the tire may be incorporated into a well-known dynamics analysis model of a vehicle (step S330) so as to be used for the analysis of dynamics of the vehicle.

The output section 18 outputs the calculated linear parameters and non-linear parameters, the characteristic curves of the CP and the SATP, or the characteristic curves of the lateral force and the torque to a printer or a monitor.

Examples of the results of the output from the computing unit 10 in this manner are shown in FIGS. 14A and 14B, FIGS. 15A and 15B, FIG. 16, FIGS. 17A to 17C and FIGS. 18A and 18B.

Figure 14A:
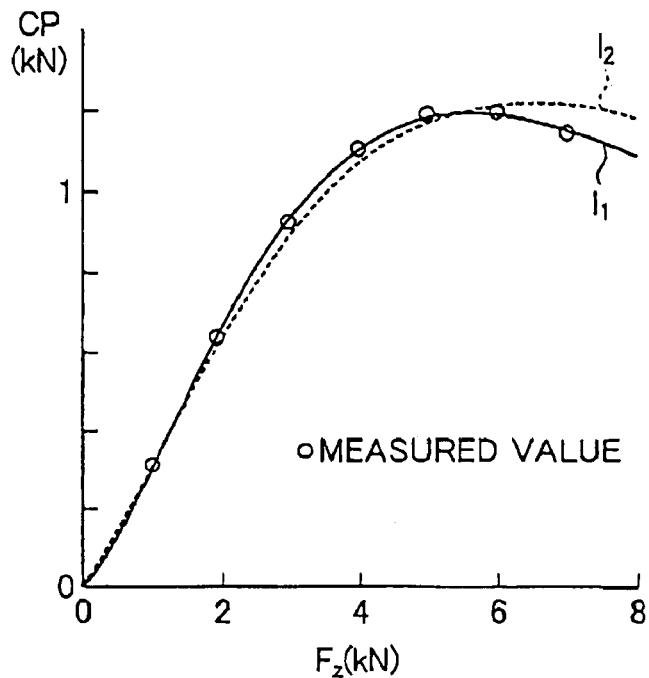
FIGS. 14A and 14B are diagrams, each showing an example of the results of an output obtained by the tire parameter deriving method and the tire cornering characteristic calculating method according to the present invention.
Figure 14B:
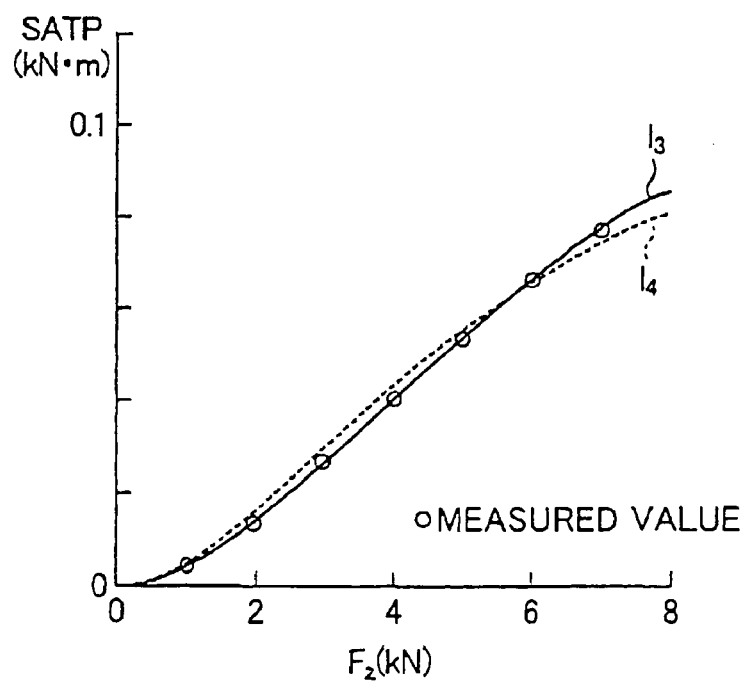

FIG. 14A shows a characteristic curve $l_1$ of load dependency of the CP calculated by using the combined sum of squared residuals in the CP/SATP parameter calculating section 20 and the CP/SATP data calculating section 24 described above, a characteristic curve $l_1$ of load dependency of the CP calculated by using the parameters calculated without using the combined sum of squared residuals, and the measured lateral force $F_y$ (plotted with circles in FIG. 14A). FIG. 14B shows a characteristic curve $l_3$ of load dependency of the SATP calculated by using the combined sum of squared residuals in the same manner as that of the characteristic curve $l_1$, a characteristic curve $l_4$ of load dependency of SATP calculated by using the parameters calculated without using the combined sum of squared residuals in the same manner as that of the characteristic curve $l_2$, and the measured torque $M_z$ (plotted with circles in FIG. 14B).

As is apparent from FIGS. 14A and 14B, the characteristic curves $l_1$ and $l_3$ calculated by using the combined sum of squared residuals match with the measured values in an extremely excellent manner as compared with the characteristic curves $l_2$ and $l_4$ calculated without using the combined sum of squared residuals.

Figure 15A:
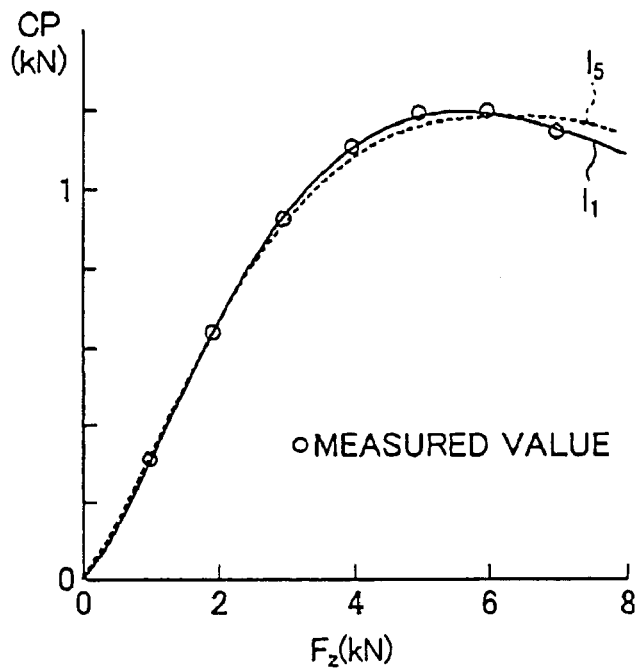
FIGS. 15A and 15B are diagrams, each showing another example of the results of an output obtained by the tire parameter deriving method and the tire cornering characteristic calculating method according to the present invention.
Figure 15B:
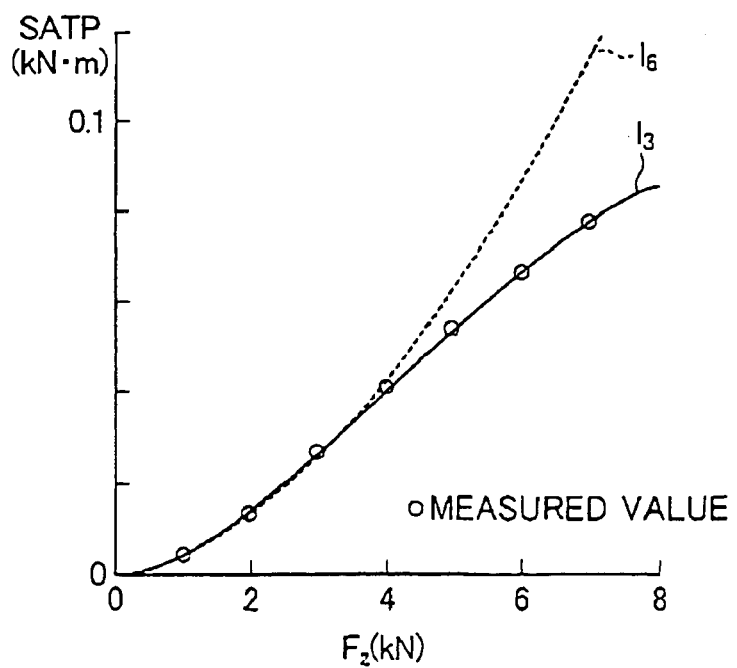

FIGS. 15A and 15B show the above-mentioned characteristic curves $l_1$ and $l_3$ and characteristic curves $l_5$ and $l_6$ of load dependency of the CP and the SATP created by using a known tire dynamic model, i.e., a Fiala model. In the known Fiala model, the effective slip angle $\alpha_e$ and the longitudinal force-based component applied by the longitudinal force acting on the contact patch to the SATP in the tire dynamic model according to the present invention are not taken into consideration.

As is apparent from FIGS. 15A and 15B, the characteristic curves $l_1$ and $l_3$ calculated by using the tire dynamic model according to the present invention match with the measured values in an extremely excellent manner as compared with the characteristic curves $l_5$ and $l_6$ calculated by using the known Fiala model.

Figure 16:
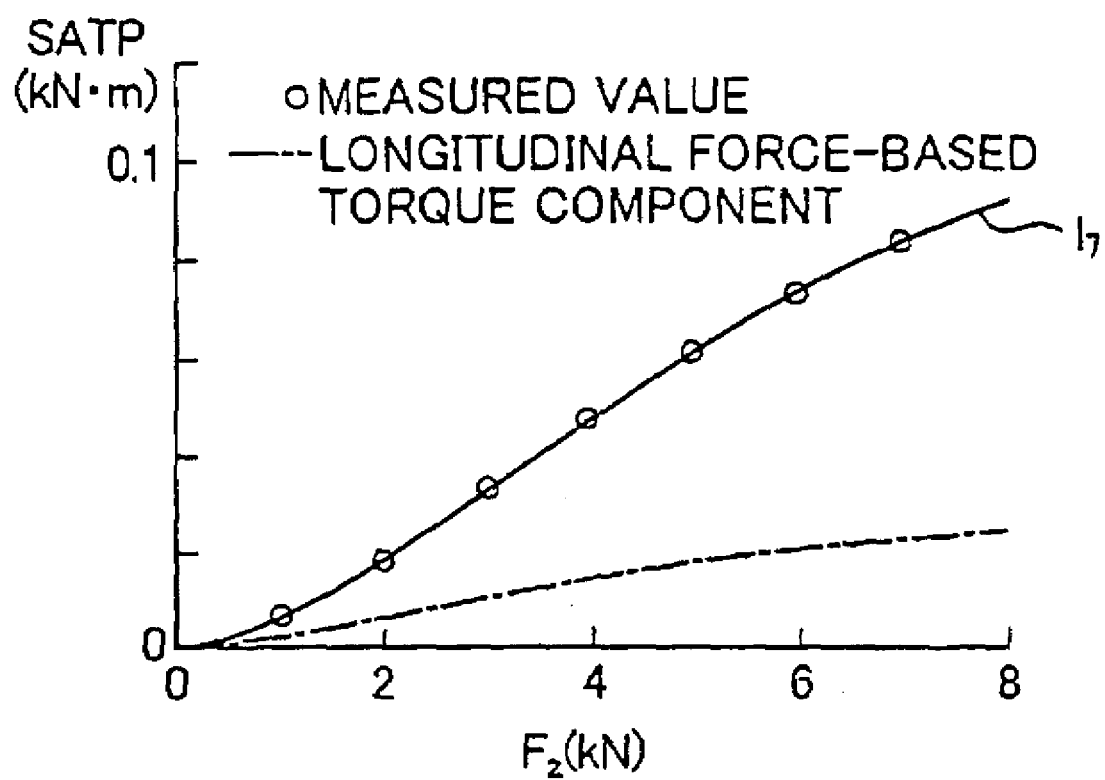
FIG. 16 is a diagram showing a further example of the results of an output obtained by the tire parameter deriving method and the tire cornering characteristic calculating method according to the present invention.

FIG. 16 shows a characteristic curve $l_7$ indicating load dependency of the SATP calculated in the CP/SATP data calculating section 24. The characteristic curve $l_7$ matches with the measured value in an extremely excellent manner. Furthermore, for the characteristic curve $l_7$, the longitudinal force-based torque component (in an alternate short and long dash line) in the SATP is shown. As can be seen from FIG. 16, the longitudinal force-based torque component contributes to the SATP at a rate of about one-third. As described above, according to the present invention, the characteristic curve of the torque can be displayed in a decomposed manner. Accordingly, the cornering characteristic of the tire can be analyzed in detail by using the tire dynamic model.

Figure 17A:
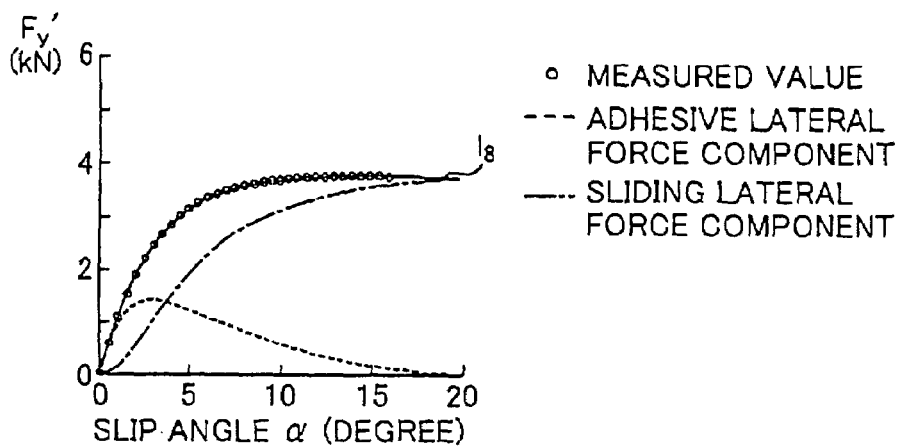
FIGS. 17A to 17C are diagrams, each showing a further example of the results of an output obtained by the tire parameter deriving method and the tire cornering characteristic calculating method according to the present invention.
Figure 17B:
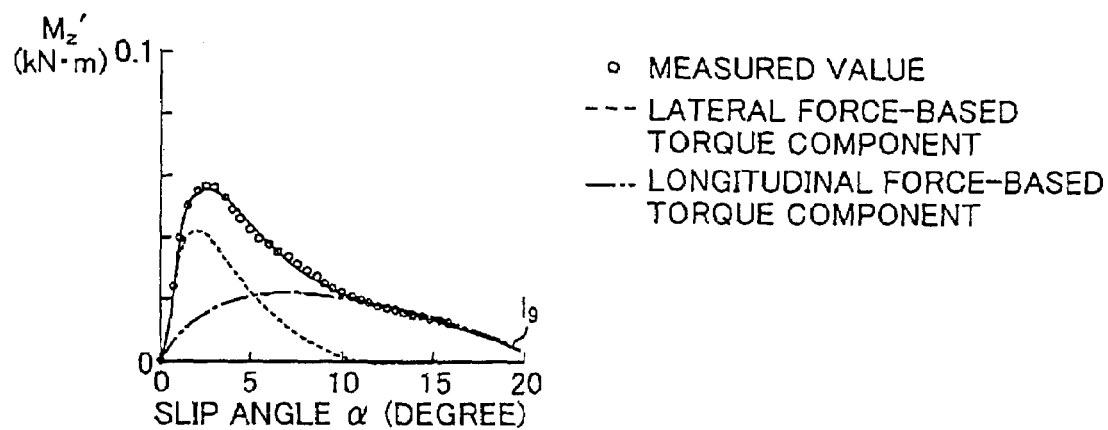

FIGS. 17A and 17B show characteristic curves $l_8$ and $l_9$ indicating slip angle dependency of the lateral force $F_y'$ and the torque $M_z'$ calculated in the above-mentioned $F_y/M_z$ data calculating section 26. The characteristic curves $l_8$ and $l_9$ match with the measured values in an extremely excellent manner.

In FIG. 17A, the characteristic curve $l_8$ is displayed separately as an adhesive lateral force component (in a dot line) in the first term of the above-mentioned Formula (5) and a sliding lateral force component (in an alternate short and long dash line) in the second term. In FIG. 17B, the characteristic curve $l_9$ is displayed in a decomposed manner as a lateral force-based torque component (in a dot line) generated by the lateral force (the adhesive lateral force component+the sliding lateral force component) in the first and second terms of the above-mentioned Formula (6) and a longitudinal force-based torque component generated by the longitudinal force. As described above, according to the present invention, each of the characteristic curves of the lateral force and the torque can be displayed in a decomposed manner. Accordingly, the cornering characteristic of the tire can be analyzed in detail.

Figure 17C:
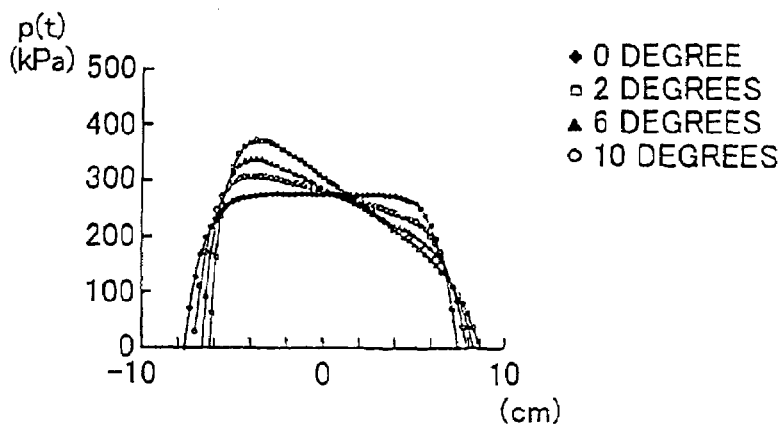

FIG. 17C shows the state of the contact pressure distribution expressed by the function $D_{gsp}(t;n, q)$ at the calculation of the parameters in the above-mentioned $F_y/M_z$ parameter calculating section 22. As the generated self-aligning torque $M_z$ increases, a peak of the contact pressure shifts toward the leading edge whereas the contact patch shifts toward the trailing edge.

As described above, according to the present invention, the characteristic curves of the tire can be accurately displayed by using the calculated parameters. As a result, the parameters are calculated from the measured data for a predetermined tire by using the above-mentioned computing unit 10. Then, a part of the results of calculation is changed at a certain rate so as to find out the sensitivity of each of the parameters, indicating how the characteristic curves are varied by changing the parameters.

Figure 18A:
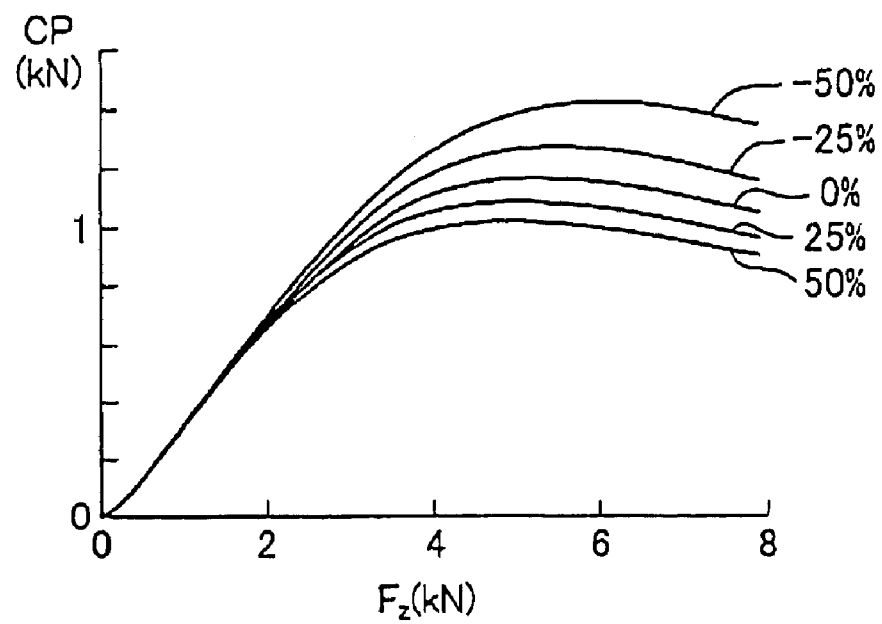
FIGS. 18A and 18B are diagrams, each showing a further example of the results of an output obtained by the tire parameter deriving method and the tire cornering characteristic calculating method according to the present invention.
Figure 18B:
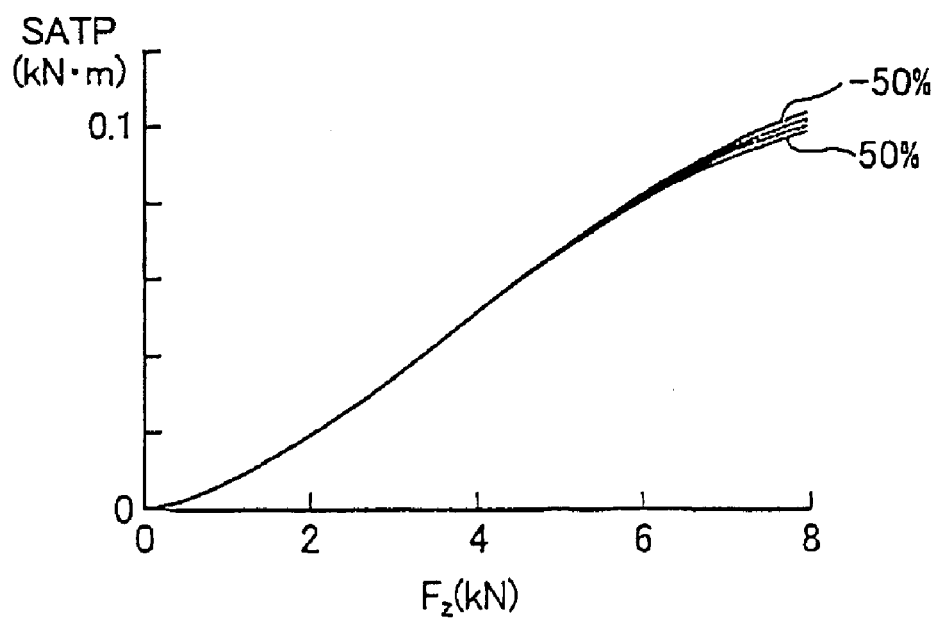

FIGS. 18A and 18B show variations in the characteristic curves of load dependency of the CP and the SATP when the lateral bending compliance ε corresponding to the calculated non-linear parameter is changed by ±25% and ±50%, respectively. FIGS. 18A and 18B show that the sensitivity of the lateral bending compliance ε to the characteristic curve of the SATP is smaller than that to the characteristic curve of the CP.

The sensitivities of various parameters in the characteristic curves of a tire are examined in this manner. Then, the parameters are adjusted so as to obtain desired characteristic curves and the tire parts realizing the adjusted parameters are selected. As a result, the tire having characteristic curves of a desired cornering characteristic can be designed.

Although the tire parameter deriving method, the tire cornering characteristic calculating method, the tire designing method, and the vehicle dynamics analyzing method according to the present invention have been described in detail, the present invention is not limited to the above-mentioned embodiment. It is apparent that various modifications and changes are possible without departing from the scope of the present invention.

What is claimed is:

1. A computer implemented method of deriving tire dynamic element parameters related to lateral force at a slip angle 1 degree, $F_y$ and self aligning torque at a slip angle of 1 degree, $M_z$ using a tire dynamic model, for computing tire cornering characteristics, the method comprising:
   a) identifying initial values of at least one non-linear parameter for a tire dynamic model;
   b) identifying a first value of a first applied load, $F_z$;
   c) acquiring measured data of lateral force at a slip angle 1 degree, $F_y$ and self-aligning torque at a slip angle 1 degree, $M_z$;
   d) determining values of at least one linear parameter for the tire dynamic model;
   e) computing lateral force at a slip angle 1 degree, $F_y'$ and self-aligning torque at a slip angle 1 degree, $M_z'$ using the tire dynamic model;
   f) identifying another value of applied load, $F_z$, and repeating steps c) d) and e) for a number of applied loads;
   g) computing a first sum of squared residuals of the measured data of the lateral force and corresponding computed data of the lateral force, the sum taken over the number of applied loads;
   h) computing a second sum of squared residuals of the measured data of the self-aligning torque and corresponding computed data of the self-aligning torque, the sum taken over the number of applied loads;

i) computing a combined sum of squared residuals as a weighted sum of the first sum of squared residuals and the second sum of squared residuals;

j) determining if the combined sum of squared residuals is equal to or less than a predetermined value;

k) adjusting the value of at least one non-linear parameter and repeating steps e) through k) until the combined sum of squared residuals is equal to or less than the predetermined value; and l) outputting the linear and nonlinear parameters to a display or printer or storing at least one of the parameters in memory.

2. The method of claim 1, further comprising reading the number of applied loads to be used in the derivation from memory.

3. The method of claim 1, farther comprising reading the initial values of the non-linear parameters from memory.

4. The method of claim 1, wherein determining values of the at least one linear parameter comprises determining values of the at least one linear parameter using linear regression models.

5. The method of claim 1, wherein the method further comprises computing an effective slip angle by correcting an initial slip angle by torsional deformation of the tire caused by the measured self-aligning torque.

6. The method of claim 1, wherein the method further comprises:
calculating a first variance of the measured data of lateral force at a slip angle of 1 degree, $F_y$, taken over the number of applied loads used in the derivation and a second variance of the measured data of self-aligning torque at a slip angle of 1 degree, $M_z$ taken over the number of applied loads used in the derivation; and
calculating a first weight to be used with the first sum of squared residuals as reciprocal of the first variance and a second weight to be used with the second sum of squared residuals as reciprocal of the second variance.

7. The method of claim 1, wherein the adjusting the values of non-linear parameters is done using a Newton-Raphson method.

8. The method of claim 1, wherein the computed lateral force at a slip angle of 1 degree, $F_y'$ includes only the lateral force due to adhesive friction and the computed self-aligning torque at a slip angle of 1 degree, $M_z'$ includes only the self-aligning torque due to adhesive friction and the self aligning torque due to longitudinal force.

9. A computer implemented method of deriving tire dynamic element parameters related to lateral force at an applied load, $F_y$, and self aligning torque at the applied load, $M_z$ using a tire dynamic model, for computing tire cornering characteristics, the method comprising:

a) identifying a first slip angle value, $\alpha$;

b) identifying initial values of at least one non-linear parameter for a tire dynamic model;

c) acquiring measured data of lateral force at the applied load, $F_y$ and self-aligning torque at the applied load, $M_z$;

d) computing at least one linear parameter for the tire dynamic model;

e) computing lateral force at the applied load, $F_y'$, self aligning torque at the applied load, $M_z'$ using the tire dynamic model;

f) identifying another value of slip angle, $\alpha$, and repeating steps c) to e) for a number of slip angles;

g) computing a first sum of squared residuals of the measured data of the lateral force at the applied load and corresponding computed data of the lateral force at the applied load, the sum taken over the number of slip angles;

h) computing a second sum of squared residuals of the measured data of the self-aligning torque at the applied load and corresponding computed data of the self-aligning torque at the applied load, the sum taken over the number of slip angles;

i) computing a combined sum of squared residuals obtained as a weighted sum of the first sum of squared residuals and the second sum of squared residuals;

j) determining if the combined sum of squared residuals is equal to or less than a predetermined value;

k) adjusting the value of at least one non-linear parameter and repeating steps d) to k) until the combined sum of squared residuals is equal to or less than the predetermined value; and l) outputting linear and nonlinear parameters to a display or printer or storing at least one of the parameters in memory.

10. The method of claim 9, further comprising reading the number of slip angles to be used in the derivation from memory.

11. The method of claim 9, computing at least one linear parameter comprises determining values of the at least one linear parameter using linear regression models.

12. The method of claim 9, wherein the method further comprises computing an effective slip angle by correcting the slip angle by torsional deformation of the tire caused by the measured self-aligning torque.

13. The method of claim 9, wherein the method further comprises:
calculating a first variance of the measured data of lateral force at the applied load, $F_y$, taken over the number of slip angles used in the derivation and a second variance of the measured data of self-aligning torque at the applied load, $M_z$ taken over the number of slip angles used in the derivation; and
calculating a first weight to be used with the first sum of squared residuals as reciprocal of the first variance and a second weight to be used with the second sum of squared residuals as reciprocal of the second variance.

14. The method of claim 9, wherein the adjusting the values of non-linear parameters is done using a Newton-Raphson method.

15. The method of claim 9, wherein the method further comprises computing the lateral force at the applied load, $F_y'$ by first computing a lateral force component due to adhesive friction and a lateral force component due to sliding friction and summing the two.

16. The method of claim 9, wherein the method further comprises computing the self-aligning torque at the applied load, $M_z'$ by first computing a self-aligning torque component due to adhesive friction, a self-aligning torque component due to sliding friction and self-aligning torque component due to longitudinal force and summing the three components.

17. The method of claim 9, wherein the method further comprises computing a location $l_h/l$ between a slip friction and an adhesive friction in contact patch.

18. A computer implemented method of deriving tire cornering characteristics represented by lateral force at a slip angle of 1 degree, $F_y$ and self aligning torque at a slip angle of 1 degree, $M_z$ using a tire dynamic model, the method comprising:

a) reading previously computed values of parameters for the tire dynamic model;

b) identifying a first value of a first applied load, $F_z$;

c) acquiring measured data of contact length l and contact width w from memory;

d) setting initial set values for lateral force at a slip angle of 1 degree, $F_y$, and self-aligning torque at a slip angle of 1 degree, $M_z$;

e) computing lateral force at a slip angle of 1 degree, $F_y'$ and self-aligning torque at a slip angle of 1 degree, $M_z'$ under the identified value of the applied load $F_z$, using the tire dynamic model, the set values, the acquired measured data, and the read values of the parameters;

f) identifying another value of applied load, $F_z$, and repeating steps c) through e) for a number of applied loads;

g) computing a first sum of squared residuals of the set value of the lateral force and corresponding computed data of the lateral force, the sum taken over the number of applied loads;

h) computing a second sum of squared residuals of the set value of the self-aligning torque and corresponding computed data of the self-aligning torque, the sum taken over the number of applied loads;

i) computing a combined sum of squared residuals as a weighted sum of the first sum of squared residuals and the second sum of squared residuals;

j) determining if the combined sum of squared residuals is equal to or less than a predetermined value;

k) adjusting the set values for lateral force at the slip angle of 1 degree, $F_y$, and self aligning torque at the slip angle of 1 degree, $M_z$ and repeating steps e) through k) until the combined sum of squared residuals is equal to or less than the predetermined value; and l) outputting tire cornering characteristics represented by the set values of lateral force at the slip angle of 1 degree, $F_y$, and self aligning torque at the slip angle of 1 degree, $M_z$ which are dependent on applied load $F_z$.

19. The method of claim 18, wherein the method further comprises computing an effective slip angle by correcting the slip angle by torsional deformation of the tire caused by the set self-aligning torque.

20. The method of claim 18, wherein the method further comprises:

calculating a first variance of the set values of lateral force at the slip angle of 1 degree, $F_y$, taken over the number of applied loads used in the derivation and a second variance of the set values of self-aligning torque at the slip angle of 1 degree, $M_z$ taken over the number of applied loads used in the derivation; and calculating a first weight to be used with the first sum of squared residuals as reciprocal of the first variance and a second weight to be used with the second sum of squared residuals as reciprocal of the second variance.

21. The method of claim 18, wherein the method further comprises adjusting the values of lateral force at the slip angle of 1 degree, $F_y$, and self-aligning torque at the slip angle of 1 degree, $M_z$ are done using a Newton-Raphson method.

22. The method of claim 18, wherein the computed lateral force at the slip angle of 1 degree, $F_y'$ includes only the lateral force due to adhesive friction and the computed self-aligning torque at the slip angle of 1 degree, $M_z'$ includes only the self-aligning torque due to adhesive friction and the self-aligning torque due to longitudinal force.

23. A computer implemented method of deriving tire cornering characteristics represented by lateral force at an applied load, $F_y$, and self-aligning torque at the applied load, $M_z$ using a tire dynamic model, the method comprising:

a) identifying previously computed values of parameters for the tire dynamic model;

b) identifying a first value of slip angle, $\alpha$;

c) acquiring measured data of contact length l and contact width w;

d) setting initial set values for lateral force at the applied load, $F_y$, and self-aligning torque at the applied load, $M_z$;

e) computing lateral force at the applied load, $F_y'$ and self-aligning torque at the applied load, $M_z'$ using the tire dynamic model, the set values, the acquired measured data and the identified previously computed parameter values;

f) identifying another value of slip angle $\alpha$, and repeating steps c) through e) for a number of slip angles;

g) computing a first sum of squared residuals of the set value of the lateral force at the applied load, $F_y$ and corresponding computed data of the lateral force at the applied load, $F_y'$, the sum taken over the number of slip angles;

h) computing a second sum of squared residuals of the set value of the self-aligning torque at the applied load, $M_z$ and corresponding computed data of the self-aligning torque at the applied load, $M_z'$, the sum taken over the number of slip angles;

i) computing a combined sum of squared residuals obtained as a weighted sum of the first sum of squared residuals and the second sum of squared residuals;

j) determining if the combined sum of squared residuals is equal to or less than a predetermined value;

k) adjusting the set values of lateral force at the applied load, $F_y$, and self-aligning torque at the applied load, $M_z$ and repeating steps e) to k) until the combined sum of squared residuals is equal to or less than the predetermined value; and l) outputting tire cornering characteristics represented by the set values of lateral force at the applied load, $F_y$, and self aligning torque at the applied load, $M_z$ which are dependent on slip angle, $\alpha$.

24. The method of claim 23, wherein the method further comprises computing an effective slip angle by correcting the slip angle by torsional deformation of the tire caused by the set self-aligning torque.

25. The method of claim 23, wherein the method further comprises:

calculating a first variance of the set values of lateral force at the applied load, $F_y$, taken over the number of slip angles used in the derivation and a second variance of the set values of self-aligning torque at the applied load, $M_z$ taken over the number of slip angles used in the derivation; and calculating a first weight to be used with the first sum of squared residuals as reciprocal of the first variance and a second weight to be used with the second sum of squared residuals as reciprocal of the second variance.

26. The method of claim 23, wherein the adjusting the values of lateral force, $F_y$, self-aligning torque, $M_z$ are done using a Newton-Raphson method.

27. The method of claim 23, wherein the method further comprises computing the lateral force, $F_y'$ by first computing a lateral force component due to adhesive friction and a lateral force component due to sliding friction and summing the two.

28. The method of claim 23, wherein the method further comprises computing the self-aligning torque, $M_z'$ by first computing a self-aligning torque component due to adhesive friction, a self-aligning torque component due to sliding friction and self-aligning torque component due to longitudinal force and summing the three components.

29. The method of claim 23, wherein the method further comprises computing a location $l_h/l$ between a slip friction and an adhesive friction in contact patch.

30. A computer readable storage medium storing computer executable instructions which when executed on a computer perform a method for deriving tire dynamic element parameters related to lateral force at a slip angle of 1 degree, $F_y$, and self aligning torque at a slip angle of 1 degree, $M_z$ using a tire dynamic model, for computing tire cornering characteristics, the method comprising:
   a) identifying initial values of at least one non-linear parameter for a tire dynamic model;
   b) identifying a first value of a first applied load, $F_z$;
   c) acquiring measured data of lateral force at a slip angle of 1 degree, $F_y$, and self-aligning torque at a slip angle of 1 degree, $M_z$;
   d) determining values of at least one linear parameter for the tire dynamic model;
   e) computing lateral force at a slip angle of 1 degree, $F_y'$ and self-aligning torque at a slip angle of 1 degree, $M_z'$ using the tire dynamic model;
   f) identifying another value of applied load, $F_z$ and repeating steps c) d) and e) for a number of applied loads;
   g) computing a first sum of squared residuals of the measured data of the lateral force and corresponding computed data of the lateral force, the sum taken over the number of applied loads;
   h) computing a second sum of squared residuals of the measured data of the self-aligning torque and corresponding computed data of the self-aligning torque, the sum taken over the number of applied loads;
   i) computing a combined sum of squared residuals as a weighted sum of the first sum of squared residuals and the second sum of squared residuals;
   j) determining if the combined sum of squared residuals is equal to or less than a predetermined value;
   k) adjusting the value of at least one non-linear parameter and repeating steps e) through k) until the combined sum of squared residuals is equal to or less than the predetermined value; and
   l) outputting linear and nonlinear parameters to a display or printer or storing at least one of the parameters in memory.

31. The computer readable storage medium of claim 30, wherein the method further comprises reading the number of applied loads to be used in the derivation from memory.

32. The computer readable storage medium of claim 30, wherein the method further comprises reading the initial values of the non-linear parameters from memory.

33. The computer readable storage medium of claim 30, wherein the method further comprises computing an effective slip angle by correcting the an initial slip angle by torsional deformation of the tire caused by the measured self-aligning torque.

34. The computer readable storage medium of claim 30, wherein the method further comprises:
   calculating a first variance of the measured data of lateral force at a slip angle of 1 degree, $F_y$, taken over the number of applied loads used in the derivation and a second variance of the measured data of self-aligning torque at a slip angle of 1 degree, $M_z$ taken over the number of applied loads used in the derivation; and
   calculating a first weight to be used with the first sum of squared residuals as reciprocal of the first variance and a second weight to be used with the second sum of squared residuals as reciprocal of the second variance.

35. The computer readable storage medium of claim 30, wherein the method further comprises adjusting the values of non-linear parameters is done using a Newton-Raphson method.

36. The computer readable storage medium of claim 30, wherein the computed lateral force at a slip angle of 1 degree, $F_y'$ includes only the lateral force due to adhesive friction and the computed self-aligning torque at a slip angle of 1 degree, $M_z'$ includes only the self-aligning torque due to adhesive friction and the self-aligning torque due to longitudinal force.

37. A computer readable storage medium storing computer executable instructions which when executed on a computer perform a method for deriving tire dynamic element parameters related to lateral force at an applied load, $F_y$, self-aligning torque at the applied load, $M_z$ using a tire dynamic model, for computing tire cornering characteristics, the method comprising:
   a) identifying a first slip angle value, $\alpha$;
   b) identifying initial values of at least one non-linear parameter for a tire dynamic model;
   c) acquiring measured data of lateral force at the applied load, $F_y$, and self-aligning torque at the applied load, $M_z$;
   d) computing at least one linear parameter for the tire dynamic model;
   e) computing lateral force at the applied load, $F_y'$, self aligning torque at the applied load, $M_z'$ using the tire dynamic model;
   f) identifying another value of slip angle, $\alpha$, and repeating steps c) to e) for a number of slip angles;
   g) computing a first sum of squared residuals of the measured data of the lateral force at the applied load and corresponding computed data of the lateral force at the applied load, the sum taken over the number of slip angles;
   h) computing a second sum of squared residuals of the measured data of the self-aligning torque at the applied load and corresponding computed data of the self-aligning torque at the applied load, the sum taken over the number of slip angles;
   i) computing a combined sum of squared residuals obtained as a weighted sum of the first sum of squared residuals and the second sum of squared residuals;
   j) determining if the combined sum of squared residuals is equal to or less than a predetermined value;
   k) adjusting the value of at least one non-linear parameter and repeating steps d) to k) until the combined sum of squared residuals is equal to or less than the predetermined value;
   l) outputting linear and nonlinear parameters to a display or printer or storing at least one of the parameters in memory.

38. The computer readable storage medium of claim 37, wherein the method further comprises reading a number of slip angles to be used in the derivation from memory.

39. The computer readable storage medium of claim 37, wherein the method further comprises reading the initial values of the non-linear parameters from memory.

40. The computer readable storage medium of claim 37, wherein computing values of the at least one linear parameter comprises determining values of the at least one linear parameter using linear regression models.

41. The computer readable storage medium of claim 37, wherein the method further comprises computing an effective slip angle by correcting the slip angle by torsional deformation of the tire caused by the measured self-aligning torque.

42. The computer readable storage medium of claim 37, wherein the method further comprises:
   calculating a first variance of the measured data of lateral force at the applied load, $F_y$, taken over the number of slip angles used in the derivation and a second variance of the measured data of self-aligning torque at the applied load, $M_z$ taken over the number of slip angles used in the derivation; and calculating a first weight to be used with the first sum of squared residuals as reciprocal of the first variance and a second weight to be used with the second sum of squared residuals as reciprocal of the second variance.

43. The computer readable storage medium of claim 37, wherein the adjusting the values of non-linear parameters is done using a Newton-Raphson method.

44. The computer readable storage medium of claim 37, wherein the method further comprises computing the lateral force at the applied load, $F_y'$ by first computing a lateral force component due to adhesive friction and a lateral force component due to sliding friction and summing the two.

45. The computer readable storage medium of claim 37, wherein the method further comprises computing the self-aligning torque at the applied load, $M_z'$ by first computing a self-aligning torque component due to adhesive friction, a self-aligning torque component due to sliding friction and self-aligning torque component due to longitudinal force and summing the three components.

46. The computer readable storage medium of claim 37, wherein the method further comprises computing a location $l_h/l$ between a slip friction and an adhesive friction in contact patch.

47. A computer readable storage medium storing computer executable instructions which when executed on a computer perform a method for deriving tire cornering characteristics represented by lateral force at a slip angle of 1 degree, $F_y$ and self aligning torque at a slip angle of 1 degree, $M_z$ using a tire dynamic model, the method comprising:

a) reading previously computed values of parameters for the tire dynamic model;

b) identifying a first value of a first applied load, $F_z$;

c) acquiring measured data of contact length, l and contact width, w from memory;

d) setting initial set values for lateral force at a slip angle of 1 degree, $F_y$, and self-aligning torque at a slip angle of 1 degree, $M_z$;

e) computing lateral force at a slip angle of 1 degree, $F_y'$ and self-aligning torque at a slip angle of 1 degree, $M_z'$ under the identified value of the applied load $F_z$, using the tire dynamic model, the set values, the acquired measured data, and the read values of the parameters;

f) identifying another value of applied load, $F_z$, and repeating steps c) through e) for a number of applied loads;

g) computing a first sum of squared residuals of the set value of the lateral force and corresponding computed data of the lateral force, the sum taken over the number of applied loads;

h) computing a second sum of squared residuals of the set value of the self-aligning torque and corresponding computed data of the self-aligning torque, the sum taken over the number of applied loads;

i) computing a combined sum of squared residuals as a weighted sum of the first sum of squared residuals and the second sum of squared residuals;

j) determining if the combined sum of squared residuals is equal to or less than a predetermined value;

k) adjusting the set values for lateral force at the slip angle of 1 degree, $F_y$ and self aligning torque at the slip angle of 1 degree, $M_z$ and repeating steps e) through k) until the combined sum of squared residuals is equal to or less than the predetermined value; and l) outputting tire cornering characteristics represented by the set values of lateral force at the slip angle of 1 degree, $F_y$ and self aligning torque at the slip angle of 1 degree, $M_z$ which are dependent on applied load $F_z$.

48. The computer readable storage medium of claim 47, wherein the method further comprises computing an effective slip angle by correcting the slip angle by torsional deformation of the tire caused by the set self-aligning torque.

49. The computer readable storage medium of claim 47, wherein the method further comprises:

calculating a first variance of the set values of lateral force at the slip angle of 1 degree, $F_y$, taken over the number of applied loads used in the derivation and a second variance of the set values of self-aligning torque at the slip angle of 1 degree, $M_z$ taken over the number of applied loads used in the derivation; and calculating a first weight to be used with the first sum of squared residuals as reciprocal of the first variance and a second weight to be used with the second sum of squared residuals as reciprocal of the second variance.

50. The computer readable storage medium of claim 47, wherein the method further comprises adjusting the values of lateral force at the slip angle of 1 degree, $F_y$ and self-aligning torque at the slip angle of 1 degree, $M_z$ are done using a Newton-Raphson method.

51. The computer readable storage medium of claim 47, wherein the computed lateral force at the slip angle of 1 degree, $F_y'$ includes only the lateral force due to adhesive friction and the computed self-aligning torque at the slip angle of 1 degree, $M_z'$ includes only the self-aligning torque due to adhesive friction and the self-aligning torque due to longitudinal force.

52. A computer readable storage medium storing computer executable instructions which when executed on a computer perform a method for deriving tire cornering characteristics represented by lateral force at an applied load, $F_y$ and self-aligning torque at the applied load, $M_z$ using a tire dynamic model, the method comprising:

a) identifying previously computed values of parameters for the tire dynamic model;

b) identifying a first value of a slip angle, $\alpha$;

c) acquiring measured data of contact length, l and contact width, w;

d) setting initial set values for lateral force at the applied load, $F_y$, and self-aligning torque at the applied load, $M_z$;

e) computing lateral force at the applied load, $F_y'$ and self-aligning torque at the applied load, $M_z'$ using the tire dynamic model, the set values, the acquired measured data and the identified previously computed parameter values;

f) identifying another value of slip angle $\alpha$, and repeating steps c) through e) for a number of slip angles;

g) computing a first sum of squared residuals of the set value of the lateral force at the applied load, $F_y$ and corresponding computed data of the lateral force at the applied load, $F_y'$, the sum taken over the number of slip angles;

h) computing a second sum of squared residuals of the set value of the self-aligning torque at the applied load, $M_z$ and corresponding computed data of the self-aligning torque at the applied load, $M_z'$, the sum taken over the number of slip angles;

i) computing a combined sum of squared residuals obtained as a weighted sum of the first sum of squared residuals and the second sum of squared residuals;

j) determining if the combined sum of squared residuals is equal to or less than a predetermined value;

k) adjusting the set values of lateral force at the applied load, $F_y$ and self-aligning torque at the applied load, $M_z$ and repeating steps e) to k) until the combined sum of squared residuals is equal to or less than the predetermined value; and l) outputting tire cornering characteristics represented by the set values of lateral force at the applied load, $F_y$, and self aligning torque at the applied load, $M_z$ which are dependent on slip angle, $\alpha$.

53. The computer readable storage medium of claim 52, wherein the method further comprises computing an effective slip angle by correcting the slip angle by torsional deformation of the tire caused by the set self-aligning torque.

54. The computer readable storage medium of claim 52, wherein the method further comprises:

calculating a first variance of the set values of lateral force at the applied load, $F_y$, taken over the number of slip angles used in the derivation and a second variance of the set values of self-aligning torque at the applied load, $M_z$ taken over the number of slip angles used in the derivation; and calculating a first weight to be used with the first sum of squared residuals as reciprocal of the first variance and a second weight to be used with the second sum of squared residuals as reciprocal of the second variance.

55. The computer readable storage medium of claim 52, wherein the adjusting the values of lateral force, $F_y$, self-aligning torque, $M_z$ are done using a Newton-Raphson method.

56. The computer readable storage medium of claim 52, wherein the method further comprises computing the lateral force, $F_y'$ by first computing a lateral force component due to adhesive friction and a lateral force component due to sliding friction and summing the two.

57. The computer readable storage medium of claim 52, wherein the method further comprises computing the self-aligning torque, $M_z'$ by first computing a self-aligning torque component due to adhesive friction, a self-aligning torque component due to sliding friction and self-aligning torque component due to longitudinal force and summing the three components.

58. The computer readable storage medium of claim 52, wherein the method further comprises computing a location $l_h/l$ between a slip friction and an adhesive friction in contact patch.

* * * * *